US012707109B2

(12) United States Patent
Lee et al.

(10) Patent No.: US 12,707,109 B2
(45) **Date of Patent: *Aug. 11, 2026**

(54) DISPLAY APPARATUS, SERVER APPARATUS, DISPLAY SYSTEM INCLUDING THEM, AND METHOD FOR PROVIDING CONTENT THEREOF

(71) Applicant: SAMSUNG ELECTRONICS CO., LTD., Suwon-si (KR)

(72) Inventors: Hee-ran Lee, Suwon-si (KR); Hee-seob Ryu, Hwaseong-si (KR); Sung-wook Choi, Suwon-si (KR); Sung-pil Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,788

(22) Filed: Apr. 17, 2024

(65) Prior Publication Data

US 2024/0267580 A1 Aug. 8, 2024

Related U.S. Application Data

(63) Continuation of application No. 17/159,388, filed on Jan. 27, 2021, now Pat. No. 12,010,373, which is a (Continued)

(30) Foreign Application Priority Data

Dec. 27, 2013 (KR) ........................ 10-2013-0165062

(51) Int. Cl.
*H04N 7/173* (2011.01)
*G06F 3/16* (2006.01)
(Continued)

(52) U.S. Cl.
CPC ....... *H04N 21/42203* (2013.01); *G06F 3/165* (2013.01); *G06F 3/167* (2013.01);
(Continued)

(58) Field of Classification Search
CPC ........... H04N 21/42203; H04N 21/431; H04N 21/4394; H04N 21/47217; H04N 21/4828;
(Continued)

(56) References Cited

U.S. PATENT DOCUMENTS 5,835,667 A 11/1998 Wactlar
6,005,565 A 12/1999 Legall
(Continued)

FOREIGN PATENT DOCUMENTS

CN 1716413 A 1/2006
CN 101465994 A 6/2009
(Continued)

OTHER PUBLICATIONS

Communication dated Apr. 16, 2020 issued by the European Intellectual Property Office in counterpart European Application No. 14 875 787.5.
(Continued)

*Primary Examiner* — Annan Q Shang
(74) *Attorney, Agent, or Firm* — Sughrue Mion, PLLC

(57) ABSTRACT

A display apparatus, including a microphone configured to receive a voice signal and a controller configured to generate a resulting screen corresponding to the voice signal different from a first displayed screen and according to a status of the content of the first displayed screen; to display the resulting screen on the display. Accordingly, the display apparatus provides a different resulting screen according to a status of the display apparatus.

20 Claims, 17 Drawing Sheets

Related U.S. Application Data continuation of application No. 14/584,838, filed on Dec. 29, 2014, now abandoned.

(51) Int. Cl.

| | |
|---|---|
| ***G10L 15/22*** | (2006.01) |
| ***G10L 15/26*** | (2006.01) |
| ***H04N 21/422*** | (2011.01) |
| ***H04N 21/431*** | (2011.01) |
| ***H04N 21/439*** | (2011.01) |
| ***H04N 21/472*** | (2011.01) |
| ***H04N 21/482*** | (2011.01) |
| ***H04N 21/643*** | (2011.01) |
| ***H04N 21/658*** | (2011.01) |
| *H04N 21/462* | (2011.01) |

(52) U.S. Cl.

CPC .............. *G10L 15/22* (2013.01); *G10L 15/26* (2013.01); *H04N 21/431* (2013.01); *H04N 21/4394* (2013.01); *H04N 21/47217* (2013.01); *H04N 21/4828* (2013.01); *H04N 21/64322* (2013.01); *H04N 21/6582* (2013.01); *G10L 2015/223* (2013.01); *H04N 21/4622* (2013.01)

(58) Field of Classification Search

CPC ......... H04N 21/64322; H04N 21/6582; H04N 21/4622; H04N 21/4722; H04N 5/445; G06F 3/165; G06F 3/167; G06F 3/048; G10L 15/22; G10L 15/26; G10L 2015/223

See application file for complete search history.

(56) References Cited

U.S. PATENT DOCUMENTS

| | | | | |
|---|---|---|---|---|
| 6,748,375 | B1 | 6/2004 | Wong | |
| 6,862,713 | B1 | 3/2005 | Kraft et al. | |
| 7,224,409 | B2 | 5/2007 | Chin | |
| 7,467,398 | B2 | 12/2008 | Fellenstein | |
| 7,644,427 | B1 | 1/2010 | Horcitz | |
| 7,953,740 | B1 | 5/2011 | Vadon | |
| 8,301,457 | B2 | 10/2012 | Yoon et al. | |
| 8,307,391 | B2 | 11/2012 | Fujiwara | |
| 8,413,188 | B2 | 4/2013 | Walter | |
| 8,620,760 | B2 | 12/2013 | King | |
| 8,635,076 | B2 | 1/2014 | Yoon | |
| 8,688,671 | B2 | 4/2014 | Ramer | |
| 8,793,739 | B2 | 7/2014 | Ko | |
| 9,098,633 | B2 * | 8/2015 | Kianovski | G06F 11/3668 |
| 9,183,832 | B2 | 11/2015 | Bak et al. | |
| 9,466,298 | B2 | 10/2016 | Kim | |
| 2002/0070958 | A1 | 6/2002 | Yeo et al. | |
| 2004/0030556 | A1 | 2/2004 | Bennett | |
| 2004/0078189 | A1 | 4/2004 | Wen et al. | |
| 2004/0117189 | A1 | 6/2004 | Bennett | |
| 2004/0123319 | A1 | 6/2004 | Kim | |
| 2005/0080625 | A1 | 4/2005 | Bennett | |
| 2006/0075429 | A1 | 4/2006 | Istvan et al. | |
| 2006/0236343 | A1 | 10/2006 | Chang | |
| 2007/0239335 | A1 | 10/2007 | Tanaka | |
| 2007/0244872 | A1 | 10/2007 | Hancock | |
| 2008/0005240 | A1 | 1/2008 | Knighton | |
| 2009/0306991 | A1 | 12/2009 | Yoon et al. | |
| 2010/0076763 | A1 | 3/2010 | Ouchi | |
| 2010/0211605 | A1 | 8/2010 | Ray | |
| 2011/0015926 | A1 | 1/2011 | Lim | |
| 2011/0060592 | A1 | 3/2011 | Kang et al. | |
| 2011/0067059 | A1 | 3/2011 | Johnston | |
| 2011/0099157 | A1 | 4/2011 | LeBeau et al. | |
| 2011/0119715 | A1 | 5/2011 | Chang | |
| 2011/0270609 | A1 * | 11/2011 | Jones | G10L 15/26 704/235 |
| 2011/0283324 | A1 | 11/2011 | Oh | |
| 2011/0301955 | A1 * | 12/2011 | Byrne | G06F 40/247 704/E15.005 |
| 2011/0313775 | A1 * | 12/2011 | Laligand | H04N 21/234336 704/E11.001 |
| 2012/0019732 | A1 | 1/2012 | Lee et al. | |
| 2012/0030712 | A1 | 2/2012 | Chang | |
| 2012/0042343 | A1 | 2/2012 | Laligand | |
| 2012/0078626 | A1 * | 3/2012 | Tsai | G10L 15/26 704/235 |
| 2012/0240177 | A1 | 9/2012 | Rose | |
| 2012/0303657 | A1 | 11/2012 | Yang | |
| 2012/0313849 | A1 | 12/2012 | Bak | |
| 2013/0006629 | A1 | 1/2013 | Honda | |
| 2013/0024197 | A1 | 1/2013 | Jang et al. | |
| 2013/0024200 | A1 * | 1/2013 | Yoon | H04N 21/42204 704/E21.001 |
| 2013/0033422 | A1 | 2/2013 | Choi et al. | |
| 2013/0033428 | A1 | 2/2013 | Choi et al. | |
| 2013/0086105 | A1 | 4/2013 | Hammontree et al. | |
| 2013/0218572 | A1 | 8/2013 | Cho et al. | |
| 2014/0195675 | A1 | 7/2014 | Silver | |
| 2014/0215513 | A1 | 7/2014 | Ramer | |
| 2014/0223481 | A1 | 8/2014 | Fundament | |
| 2014/0259072 | A1 | 9/2014 | Chuang | |
| 2014/0278400 | A1 | 9/2014 | Coussemaeker | |
| 2014/0294302 | A1 | 10/2014 | King | |
| 2014/0324424 | A1 | 10/2014 | Kim | |
| 2014/0324583 | A1 | 10/2014 | Chen | |
| 2014/0365859 | A1 | 12/2014 | Migos | |
| 2015/0127353 | A1 | 5/2015 | Cho et al. | |
| 2015/0172770 | A1 | 6/2015 | Kim et al. | |
| 2015/0189390 | A1 * | 7/2015 | Sirpal | H04N 21/43074 725/51 |
| 2016/0196022 | A1 | 7/2016 | Matsui | |
| 2017/0006356 | A1 * | 1/2017 | Krasadakis | H04N 21/4532 |
| 2017/0195610 | A1 | 7/2017 | Moon | |

FOREIGN PATENT DOCUMENTS

| | | | |
|---|---|---|---|
| CN | 101605223 | A | 12/2009 |
| CN | 102280106 | A | 12/2011 |
| CN | 102395013 | A | 3/2012 |
| CN | 102591932 | A | 7/2012 |
| CN | 102708185 | A | 10/2012 |
| CN | 102833582 | A | 12/2012 |
| CN | 102841772 | A | 12/2012 |
| CN | 103108235 | A | 5/2013 |
| CN | 103150011 | A | 6/2013 |
| EP | 1176503 | A2 | 1/2002 |
| EP | 2555537 | A1 | 2/2013 |
| JP | 2011-16620 | A | 1/2011 |
| KR | 10-2006-0038299 | A | 5/2006 |
| KR | 10-2012-0104473 | A | 9/2012 |
| KR | 10-2012-0135855 | A | 12/2012 |
| KR | 10-2013-0057338 | A | 5/2013 |
| KR | 10-2013-0125067 | A | 11/2013 |
| KR | 10-2013-0134545 | A | 12/2013 |

OTHER PUBLICATIONS

Communication dated Apr. 4, 2018, issued by the Chinese Patent Office in counterpart Chinese Application No. 201480071052.6.

Communication dated Aug. 8, 2019, issued by the Korean Intellectual Property Office in corresponding Korean Application No. 10-2013-0165062.

Communication dated Dec. 21, 2016, issued by the European Patent Office in counterpart European Application No. 14875787.5.

Communication dated Jan. 12, 2022, issued by the China National Intellectual Property Administration in counterpart Chinese Application No. 201810366079.8.

Communication dated Jan. 20, 2020 issued by the State Intellectual Property Office of P.R. China in counterpart Chinese Application No. 201480071052.6.

Communication dated Jan. 24, 2022, issued by the Korean Intellectual Property Office in Korean Patent Application No. 10-2021-0152617.

(56) References Cited

OTHER PUBLICATIONS

Communication dated Jan. 4, 2019 issued by the State Intellectual Property Office of P.R. China in counterpart Chinese Application No. 201480071052.6.
Communication dated Jun. 2, 2020 issued by the European Intellectual Property Office in counterpart European Application No. 14 875 787.5.
Communication dated Mar. 26, 2020 issued by the Korean Intellectual Property Office in counterpart Korean Application No. 10-2020-0032458.
Communication dated May 17, 2021 issued by the European Patent Office in European Application No. 20188749.4.
Communication dated May 18, 2021 in Intellectual Property Office of the P.R.China in Chinese Application No. 201810366079.8.
Communication dated May 19, 2020 issued by the European Intellectual Property Office in counterpart European Application No. 14 875 787.5.
Communication dated May 27, 2020 issued by the State Intellectual Property Office of P.R. China in counterpart Chinese Application No. 201480071052.6.
Communication dated May 31, 2019, from the State Intellectual Property Office of People's Republic of China in counterpart Application No. 201480071052.6.
Communication dated Nov. 28, 2019 issued by the European Patent Office in counterpart European Application No. 14875787.5.
Communication dated Oct. 29, 2018 issued by the European Intellectual Property Office in counterpart European Application No. 14 875 787.5.
Communication issued Aug. 23, 2022 by the European Patent Office for European Patent Application No. 20188749.4.
Communication issued by the European Patent Office on Mar. 22, 2023 in European Patent Application No. 20188749.4.
Communication issued by the Korean Intellectual Property Office on Mar. 7, 2023 in Korean Patent Application No. 10-2022-0142969.
Communication issued Oct. 15, 2020 by the Korean Intellectual Property Office in counterpart Korean Patent Application No. 10-2020-0032458.
Communication issued on Jul. 26, 2023 by the Korean Intellectual Property Office in Korean Patent Application No. 10-2022-0142969.
Communication issued on Jul. 7, 2023 by the European Patent Office in European Patent Application No. 23174367.5.
Communication issued Sep. 2, 2020 by the European Patent Office in counterpart European Patent Application No. 20188749.4.
Communication issued Sep. 23, 2020 by the State Intellectual Property Office of P.R. China in counterpart Chinese Patent Application No. 201810366079.8.
Communication issued Sep. 25, 2020 by the State Intellectual Property Office of P.R. China in counterpart Chinese Patent Application No. 201480071052.6.
International Search Report for PCT/KR2014/010017 dated Jan. 20, 2015 [PCT/ISA/210].
Office Action dated Dec. 21, 2023, issued by the Korean Patent Office in Korean Patent Application No. 10-2022-0142969.
Written Opinion for PCT/KR2014/010017 dated Jan. 20, 2015 [PCT/ISA/237].
Communication issued on Oct. 20, 2025 by the China National Intellectual Property Office in Chinese Patent Application No. 201810366079.8.
Communication dated Apr. 16, 2025, issued by the European Patent Office in European Application No. 23174367.5.

* cited by examiner

FIG. 5

410
411-1
411-2
411-3
411-4
CCC
411-5
411-6
411-7
411-8
10
DDD, please.
510
511-1
DDD
DDD PART 1
DDD PART 2
DDDDD
DDD-n
dddd
511-n

FIG. 10

DISPLAY APPARATUS, SERVER APPARATUS, DISPLAY SYSTEM INCLUDING THEM, AND METHOD FOR PROVIDING CONTENT THEREOF

CROSS-REFERENCE TO RELATED APPLICATION

This application is a Continuation application of U.S. application Ser. No. 17/159,388, filed on Jan. 27, 2021, which is a Continuation application of U.S. application Ser. No. 14/584,838, filed on Dec. 29, 2014, which claims priority under 35 U.S.C. § 119(a) from Korean Patent Application No. 10-2013-0165062, filed on Dec. 27, 2013 in the Korean Intellectual Property Office, the entire disclosure of which is hereby incorporated by reference.

TECHNICAL FIELD

Apparatuses and methods consistent with exemplary embodiments relate to a display apparatus, a server apparatus, and a display system including them, which provide a variety of information in response to a user's voice, and a method for providing contents thereof.

BACKGROUND

With the development of electronic technologies, various kinds of electronic apparatuses have been developed and distributed. In particular, various types of electronic apparatuses including televisions (TVs) are used in general households. Such electronic apparatuses are equipped with various functions to meet the demands of users.

For example, the TV can access the Internet and support Internet-based services. In addition, users can view many digital broadcasting channels through the TV.

Accordingly, control methods are implemented to more easily use various functions of the display apparatus. For example, display apparatuses that can recognize a user's voice and can be controlled by the user's voice are being developed.

However, the related-art display apparatus only provides a service corresponding to a keyword included in the voice signal uttered by the user. That is, the related-art display apparatus provides limited services.

Therefore, there is a demand for a method for providing various resulting screens according to a user's utterance intention.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus, a server apparatus, and a display system including them, which can provide various resulting screens according to a status of a content displayed on the display apparatus, and a method for providing contents thereof.

According to an aspect of an exemplary embodiment, there is provided a display apparatus including a microphone configured to receive a voice signal and a controller configured to generate a resulting screen corresponding to the voice signal different from a first displayed screen and according to a status of the content of the first displayed screen.

The display apparatus may further include a communicator configured to communicate with a server apparatus, the server apparatus being configured to perform a search corresponding to the status information and the text. The controller may transmit status information on the at least one content and a text corresponding to the voice signal to the server apparatus through the communicator, and, when a result of searching corresponding to the status information and the text is received from the server apparatus, the controller may generate the resulting screen according to the result of the searching.

When the voice signal is input, the controller may transmit the voice signal to a text converter through the communicator, and, when the voice signal is converted into the text by the text converter, the controller may receive the text from the text converter through the communicator.

The display apparatus may include a processor to replay a content, where the controller may receive address information for acquiring the designated content from the server apparatus, may acquire the designated content according to the address information, and may control the content processor to replay the acquired content.

When the result of the searching based on the voice signal is received from the server apparatus, the controller may control the graphic processor to generate the resulting screen based on the result of the searching.

The display apparatus may include a processor to replay a content, according to the status of the content on the first displayed screen. When a content designated by the voice signal exists in the first displayed screen, the controller may receive address information for acquiring the designated content from the server apparatus, acquire the designated content according to the address information, replay the acquired content, and display the content on the resulting screen. When the content designated by the voice signal does not exist in the first displayed screen, the controller may receive the result of the searching based on the voice signal from the server apparatus and may generate the resulting screen based on the result of the searching.

The status information may include at least one from among title information, alias title information, and identification information of the content included in the first displayed screen.

The status information may include at least one from among identification information of the at least one content, information on a type of content, content setting information, and information on the number of contents included in the first displayed screen.

According to an aspect of another exemplary embodiment, there is provided a display apparatus configured to be controlled by an input of a voice signal, a text converter configured to convert the voice signal input to the display apparatus into a text, and a server apparatus configured to perform searching according to status information of a screen display on the display apparatus and the text received from the display apparatus, and provide a result of the searching to the display apparatus, such that the display apparatus displays a resulting screen according to the result of the searching.

The text converter may be included in the server apparatus.

The server apparatus receives the status information and the text from the display apparatus simultaneously.

The server apparatus may receive the status information from the display apparatus first and may subsequently receive the text.

The server apparatus may identify contents included in a current screen of the display apparatus based on the status information.

When a content designated by the text exists in the screen of the display apparatus, the server apparatus may search address information for acquiring the designated content, and may transmit the address information to the display apparatus.

When the content designated by the text does not exist in the screen of the display apparatus, the server apparatus may perform searching by using the text and may transmit a result of the searching to the display apparatus.

The input may be received by the display apparatus.

According to an aspect another exemplary embodiment, there is provided a method for providing content information of a display apparatus, the method including displaying a screen including at least one content; receiving a voice signal; and generating a resulting screen corresponding to the voice signal differently according to a status of the content in the screen and displaying the resulting screen.

The method may further include transmitting status information on the at least one content and a text corresponding to the voice signal to a server apparatus, searching the server apparatus corresponding to the transmitted status information and the text, and receiving a result of the searching and generating the resulting screen based on the result of the searching.

The method may further include, when the voice signal is input, transmitting the voice signal to a text converter; and, when the voice signal is converted into the text by the text converter, receiving the text.

The displaying may include, when a content designated by the voice signal exists in the screen, receiving address information for acquiring the designated content from the server apparatus, acquiring the designated content according to the address information, replaying the acquired content, and displaying the content on the resulting screen. The displaying may include, when the content designated by the voice signal does not exist in the screen, receiving a result of searching the content designated by the voice signal from the server apparatus, and generating the resulting screen based on the result of the searching and displaying the resulting screen.

According to another exemplary embodiment, there is provided a display apparatus, including a display configured to display at least one content, a graphic processor configured to generate at least one screen having a content different from the displayed at least one content according to a user input, and a controller configured to control the display to display the generated at least one screen.

The display apparatus may also include a microphone configured to receive the user input, and the controller may control the microphone to send the user input to the graphic processor.

The user input may be a voice signal.

The microphone may include a microphone.

According to another exemplary embodiment, there is provided a method for displaying content on a display, the method including displaying at least one content on a display, receiving an input, generating at least one screen having a content different from the displayed at least one content, and displaying the generated at least one screen on the display.

The input may be a voice signal.

The method may include, when the user input is received, searching a server apparatus according to the user input, wherein the generating is performed according to a result of the searching.

The status information may include at least one of information on a kind of a screen displayed on the display apparatus, screen depth information, title information of the at least one content, alias title information of the at least one content, identification information of the at least one content, and information on the number of contents included in the screen.

According to an aspect of still another exemplary embodiment, there is provided a method for providing content information of a server apparatus, the method including: receiving status information on at least one content in a screen which is being displayed by a display apparatus and a text corresponding to a voice signal input to the display apparatus; and performing searching based on the status information and the text and transmitting a result of the searching to the display apparatus.

The transmitting the result of the searching to the display apparatus includes, when a content designated by the text exists in the screen of the display apparatus, transmitting address information for acquiring the designated content to the display apparatus, and, when the content designated by the text does not exist in the screen of the display apparatus, performing searching on the content designated by the text and transmitting the result of the searching to the display apparatus.

The status information may include at least one of information on a kind of a screen displayed on the display apparatus, screen depth information, title information of the at least one content, alias title information of the at least one content, identification information of the at least one content, and information on the number of contents included in the screen.

According to various exemplary embodiments described above, when a user's voice is input, the display apparatus may configure a resulting screen corresponding to the voice variously according to a status of the display apparatus and may display the resulting screen. Accordingly, a voice control can be performed according to a user's intention.

BRIEF DESCRIPTION OF THE DRAWINGS

The above and/or other aspects will be more apparent by describing in detail exemplary embodiments, with reference to the accompanying drawings, in which:

FIGS. 2 to 11 are views to illustrate an operation of a display apparatus according to various exemplary embodiments;

DETAILED DESCRIPTION

Figure 1:
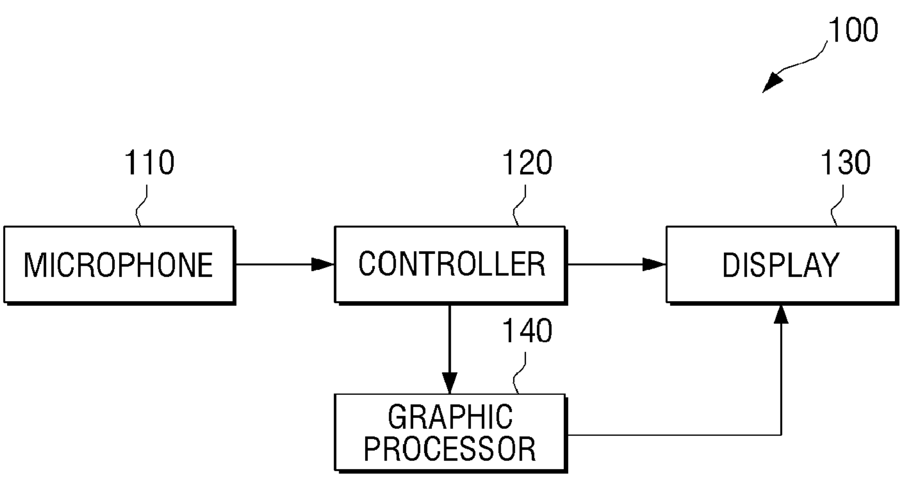
FIG. 1 is a block diagram illustrating a configuration of a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a display apparatus according to an exemplary embodiment. The display apparatus 100 of FIG. 1 may be implemented by using various types of apparatuses such as a TV, a Personal Computer (PC), a laptop PC, a mobile phone, a tablet PC, a Personal Digital Assistant (PDA), an MP3 player, an electronic album, a kiosk, etc. Referring to FIG. 1, the display apparatus 100 includes a microphone 110, a controller 120, a display 130, and a graphic processor 140.

The microphone 110 is an element for receiving a voice signal of a user. The configuration of the microphone 110 may vary according to various exemplary embodiments. For example, the microphone 110 may include a microphone to directly receive the voice or may receive the user voice through a microphone provided on a remote controller. For a voice signal to be inputted, a microphone itself may be used, and a microphone which is included in an audio-visual (AV) apparatus, a computer, a portable computer, a mobile phone, a smart phone and a remote controller may be used.

The controller 120 is an element for controlling an overall operation of the display apparatus 100.

The graphic processor 140 is an element for configuring various screens. Specifically, the graphic processor 140 may generate a screen including various objects such as an icon, an image, and a text using an operator (not shown) and a renderer (not shown). The operator calculates attribute values of each object to be displayed, such as coordinates values, a shape, a size, and a color, according to a layout of the screen. The renderer generates screens of various layouts including objects based on the attribute values calculated by the operator. The screen generated by the renderer is provided to the display 130.

The display 130 displays various screens generated by the graphic processor 140. When the display apparatus 100 is a broadcast receiving apparatus for receiving and processing broadcast signals, the display 130 displays a broadcast program screen. When the display apparatus 100 downloads contents from various content providing servers such as an Internet Protocol (IP) server, the display 130 may display a content playback screen.

In addition, the controller 120 may control the graphic processor 140 to configure various screens such as a content selection screen through which various contents are selected, a main screen through which various menus are selected, a preference function screen which displays functions frequently used by the user, and a viewing history screen for guiding information on contents that the user has viewed. When a user's voice signal is input while a screen including at least one content is being displayed on the display 130, the controller 120 may control the graphic processor 140 to configure a resulting screen corresponding to the voice signal. The screen generated by the graphic processor 140 may be provided to the display 130 and displayed. In this case, the controller 120 may control the graphic processor 140 to configure a different resulting screen according to information of the content included in the screen.

Although the graphic processor 140 is an element separate from the controller 120 in FIG. 1, the graphic processor 140 may be implemented as a Graphic Processing Unit (GPU) provided in the controller 120. However, an extra illustration thereof is omitted.

FIGS. 2 to 11 are views illustrating an operation of a display apparatus according to various exemplary embodiments.

Figure 2:
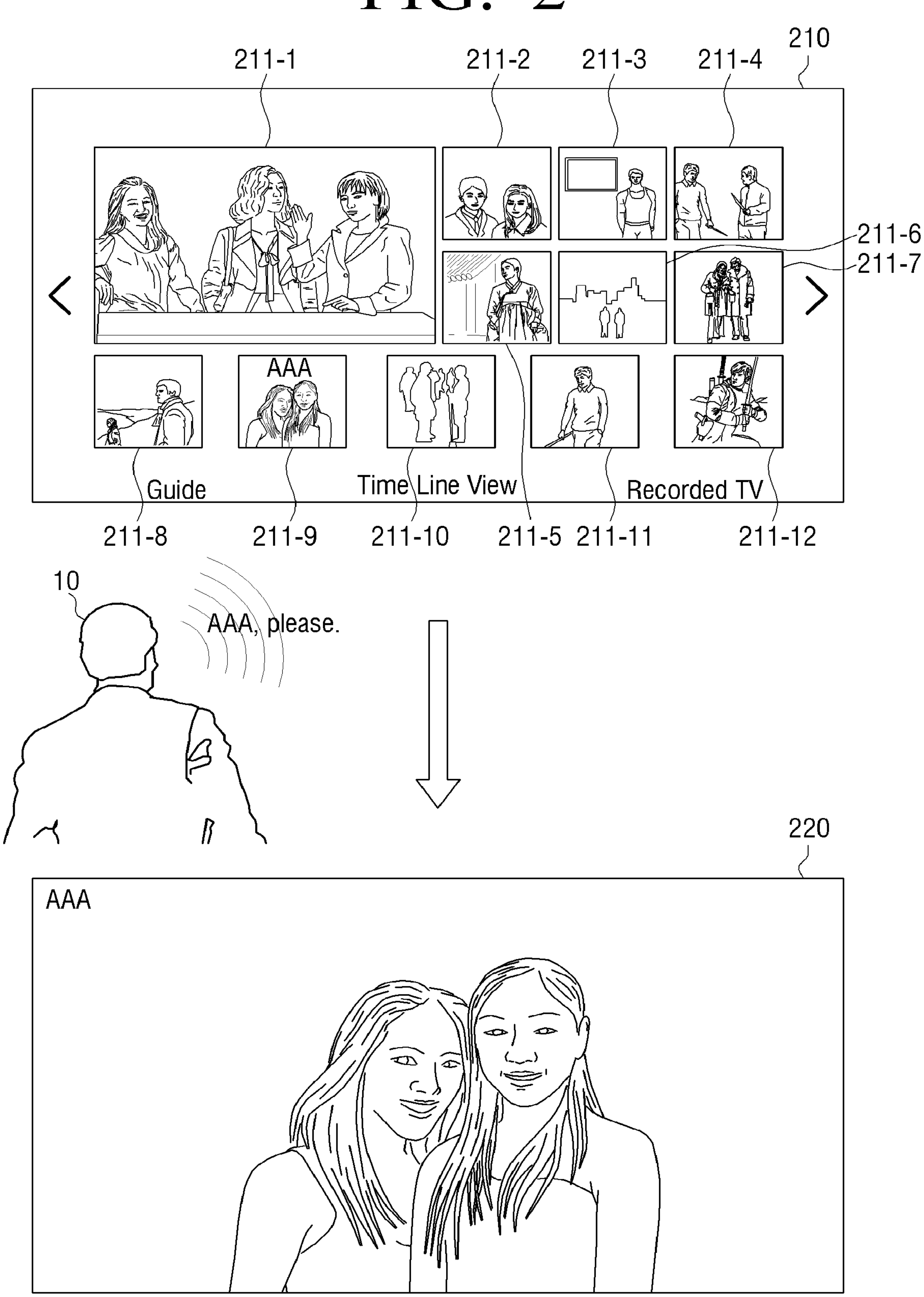

FIG. 2 is a view illustrating the performance of a different operation according to whether a content designated by a user's voice signal is included in a screen or not according to an exemplary embodiment.

As shown in FIG. 2, the display 100 may display a screen 210 including information of contents which are currently broadcasted. Such a screen 210 may be called various names such as a content selection screen or an ONTV panel. Referring to FIG. 2, thumbnail images 211-1 to 211-12 regarding viewable contents provided through a TV broadcast network, an IP network, and other various routes may be displayed on the screen 210 according to a predetermined layout.

When a user 10 utters a voice signal including a title of a content in the screen while the screen 210 is being displayed, the controller 120 displays a resulting screen 220 corresponding to the voice signal based on the voice signal and a status of the display apparatus 100. For example, when one of the plurality of thumbnail images 211-1 to 211-12 (for example, 211-9) is a thumbnail image regarding a content titled "AAA", and the user 10 says "AAA, please.", the controller 120 performs a control operation to directly select and replay the AAA content. Specifically, the display apparatus 100 may further include a processor (not shown) to replay the contents. The controller 120 may control the processor to replay the AAA content.

Accordingly, the display 130 displays the playback screen 220 of the AAA content. The AAA content may be provided from various sources. For example, when the display apparatus 100 has already stored the AAA content, the display apparatus 100 may directly replay the stored AAA content. When the AAA content is a broadcast program provided from a specific broadcasting station through a broadcast channel, the controller 120 controls a tuner (not shown) to tune to the corresponding broadcast channel and receives the broadcast program through the broadcast channel. When the AAA content is a content provided from a content providing server (not shown), the controller 120 controls a communicator (not shown) to access the content providing server using address information for acquiring the AAA content, and downloads the AAA content. The address information may be information that is pre-stored by the display apparatus 100. However, according to another exemplary embodiment, a server apparatus (not shown) interworking with the display apparatus 100 may provide the address information. The processor and the communicator mentioned in the above-described exemplary embodiment will be explained below in detail with reference to the drawings.

Figure 3:
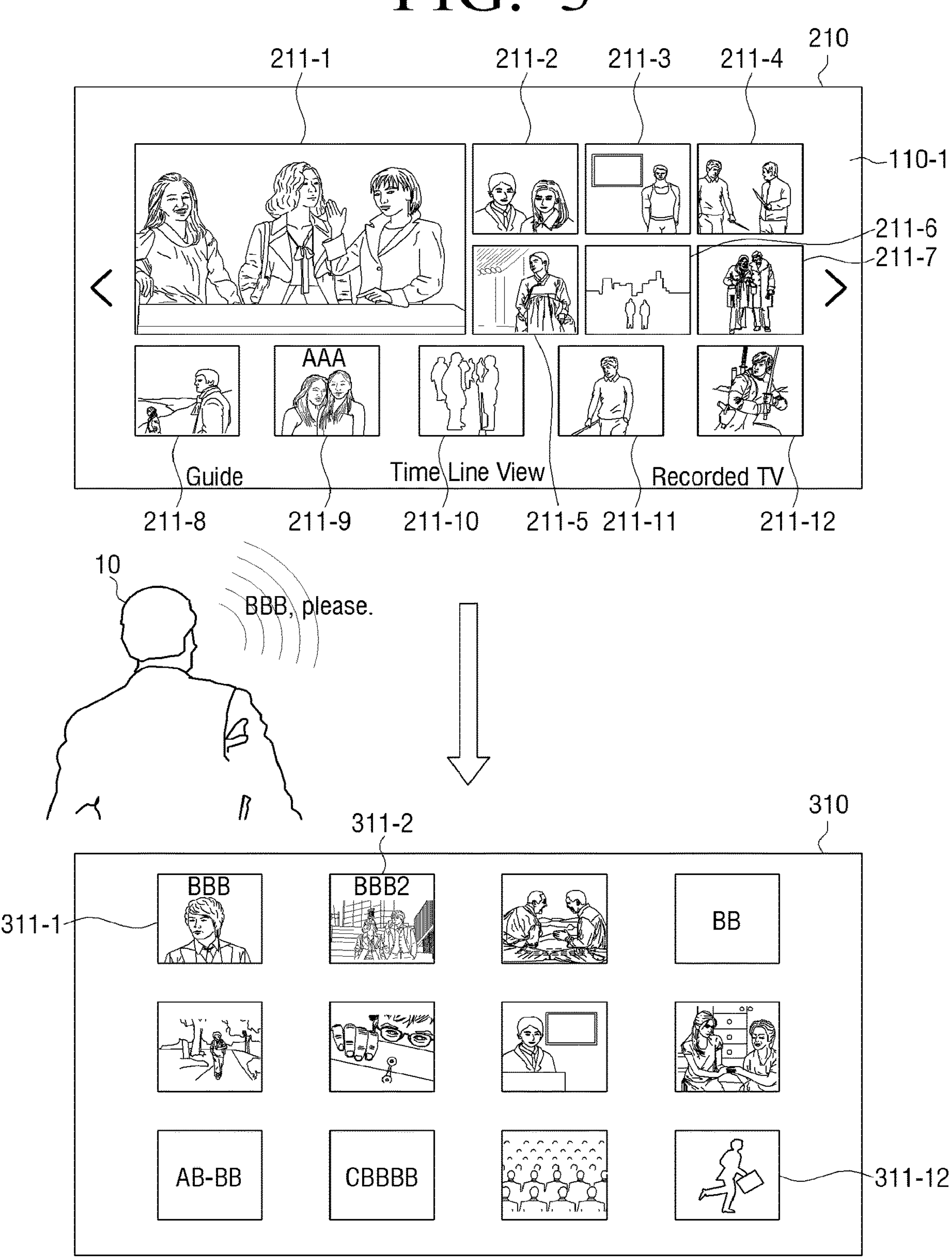

The user 10 may say a title of a content that is not included in the screen. FIG. 3 illustrates a case in which the user says "BBB, please" while the same screen 210 as in FIG. 2 is being displayed. When the BBB content designated by the user's voice signal does not exist in the current screen 210, the controller 120 displays a search result screen 310 which is a result of searching the BBB content. According to an exemplary embodiment, the search may be performed in various apparatuses. For example, the controller 120 of the display apparatus 100 may perform the search or an external server apparatus performs the search and provides a corresponding result to the controller 120. The search result screen 310 of FIG. 3 includes various items 311-1 to 311-12 including the keyword BBB.

When one of the items 311-1 to 311-12 is selected by the user, the controller 120 may replay a content corresponding to the selected item and output the content through the display 130.

According to the exemplary embodiments described above with reference to FIGS. 2 and 3, the display apparatus 100 may perform a different control operation according to whether information on the content designated by the user's voice signal is included in the current screen or not. Accordingly, the user may replay a specific content directly or may search for the content.

According to another exemplary embodiment, the display apparatus 100 may provide various resulting screens according to a kind of a screen currently displayed.

For example, when the user inputs the voice signal while the screen 210 including information on currently viewable contents is being displayed as shown in FIG. 2, the controller 120 may perform a different operation according to whether the content is included in the screen 210 or not.

Figure 4:
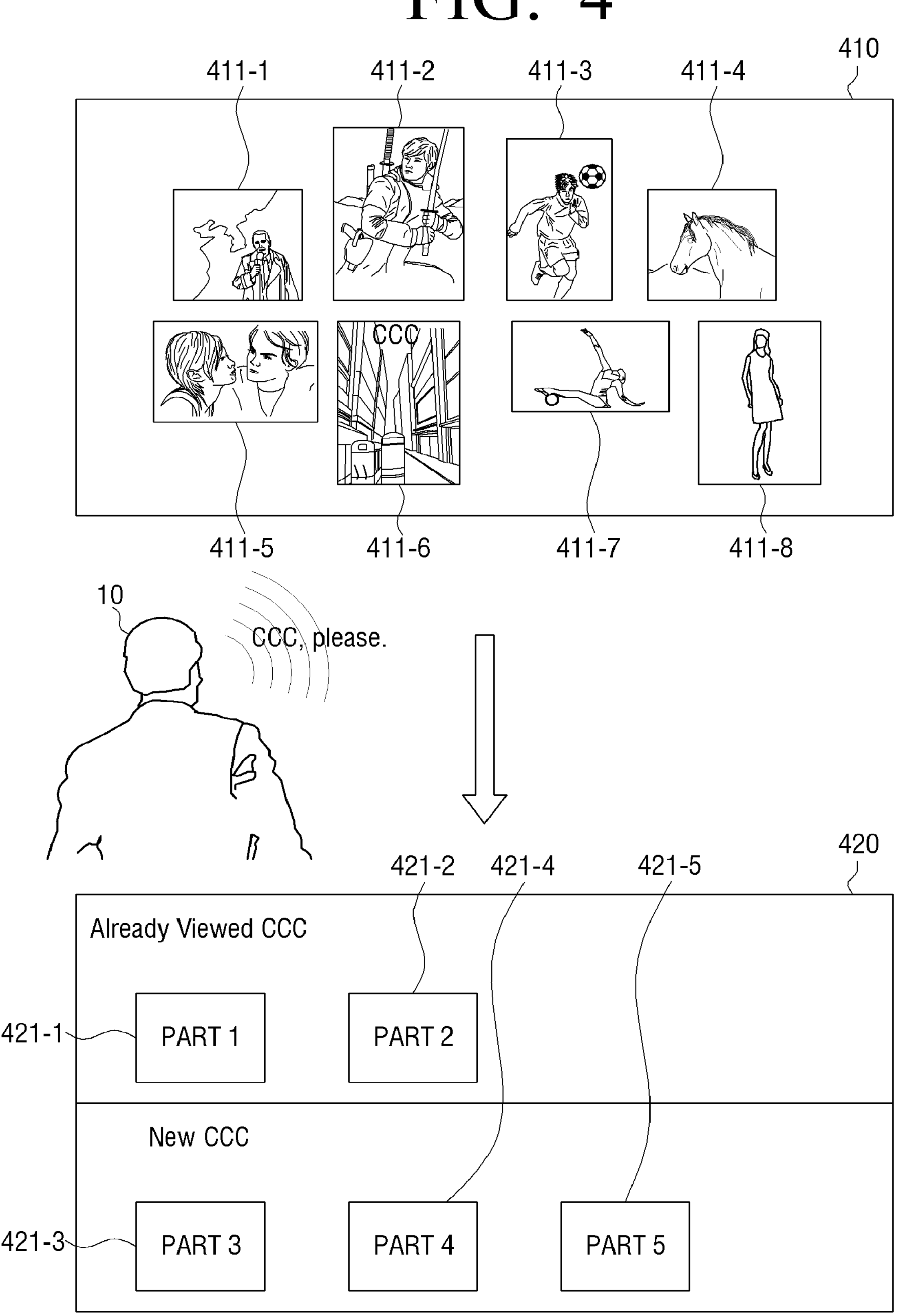

On the other hand, when a screen 410 including information on contents preferred by the user is displayed as shown in FIG. 4, and the user inputs a voice signal designating a specific content included in the screen 410, the controller 120 may not directly replay the content and may perform a different control operation.

Specifically, as shown in FIG. 4, the display apparatus 100 may display the screen 410 including the contents that the user viewed before, relevant contents, similar contents, etc. Such a screen 410 may be called various names, such as a preference content screen, a MYCONTENTS screen, a viewing history content, etc. Referring to FIG. 4, thumbnail images 411-1 to 411-8 associated with the contents may be displayed on the screen 410 according to a predetermined layout. The layout of the screen 410 of FIG. 4 may be different from the layout of the screen 210 of FIGS. 2 and 3.

In this state, when the voice signal uttered by the user is input through the microphone 110, the controller 120 determines whether information on a content corresponding to the voice signal, namely a thumbnail image is included in the current screen 410 or not. When the thumbnail image (for example, 411-6) of the content corresponding to the voice signal exists, the controller 120 may display a search result screen 420 having various contents related to the corresponding content on the display 130. The search result screen 420 may include information on contents 421-1 and 421-2 that have been already viewed in relation to the corresponding content, and information on contents 421-3 to 421-5 that are newly viewable. When the corresponding content is a moving image consisting of a plurality of series, the controller 120 may distinguish between the series 421-1 and 421-2 that the user has already viewed and the series 421-3, 421-4, and 421-5 that the user has not viewed. When the user inputs a voice signal (for example, "part 3") to designate a specific part of the content (for example, 421-3) while the screen 420 is being displayed, the controller 120 may directly replay the corresponding content and output the content.

Figure 5:
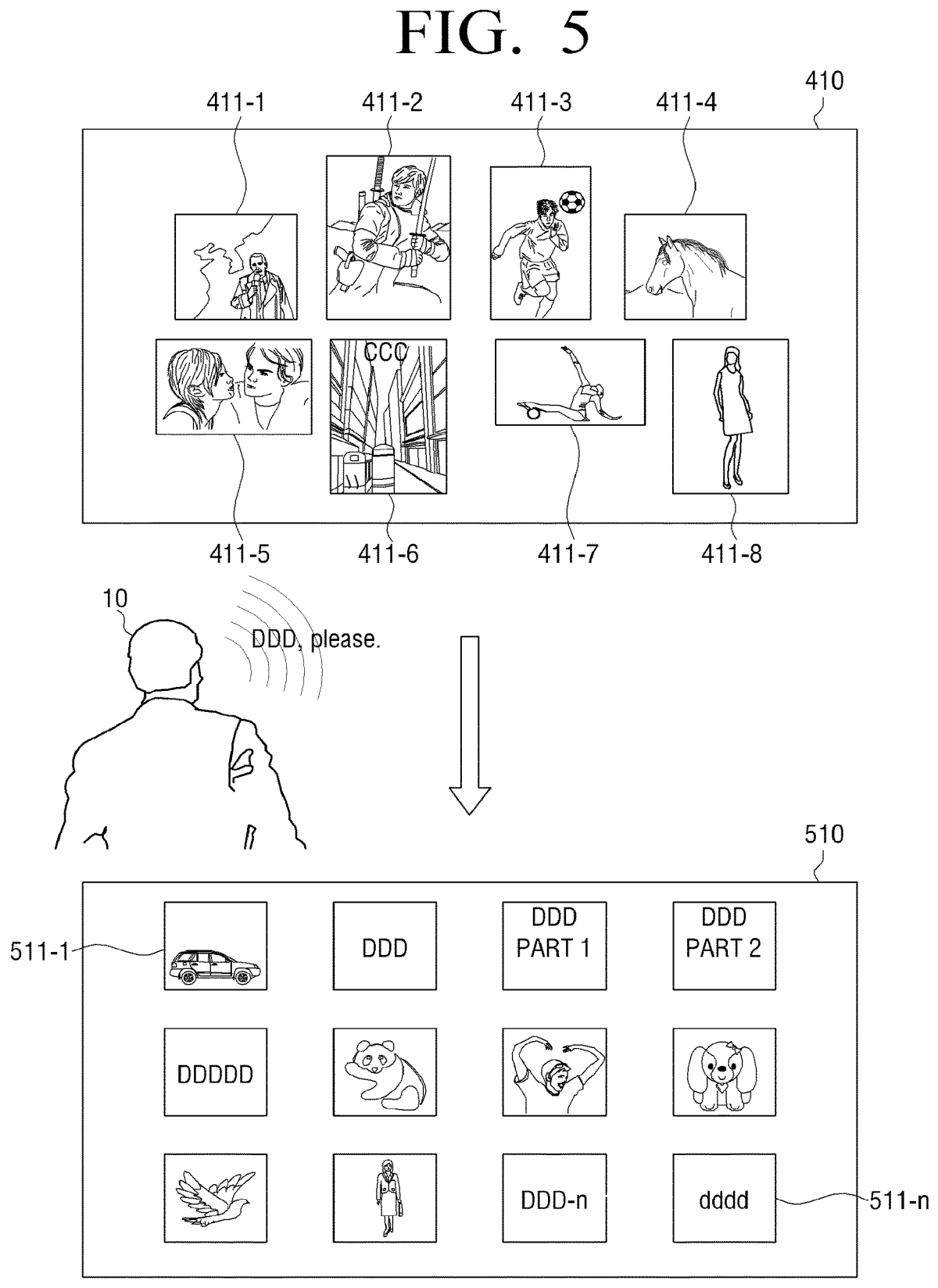

FIG. 5 illustrates a case in which a content designated by a user's voice signal does not exist on the screen 410 which includes the information on the contents preferred by the user. For example, when the user inputs a voice signal "DDD, please" to designate a content (for example, DDD) that does not exist in the screen 410 as shown in FIG. 5, the controller 120 displays a search result screen 510 regarding the identification word DDD from among the keywords included in the corresponding voice signal. The search result screen 510 may include information on contents 511-1 to **511-*n*** that have various titles including the text DDD.

Figure 6:
Figure 6:
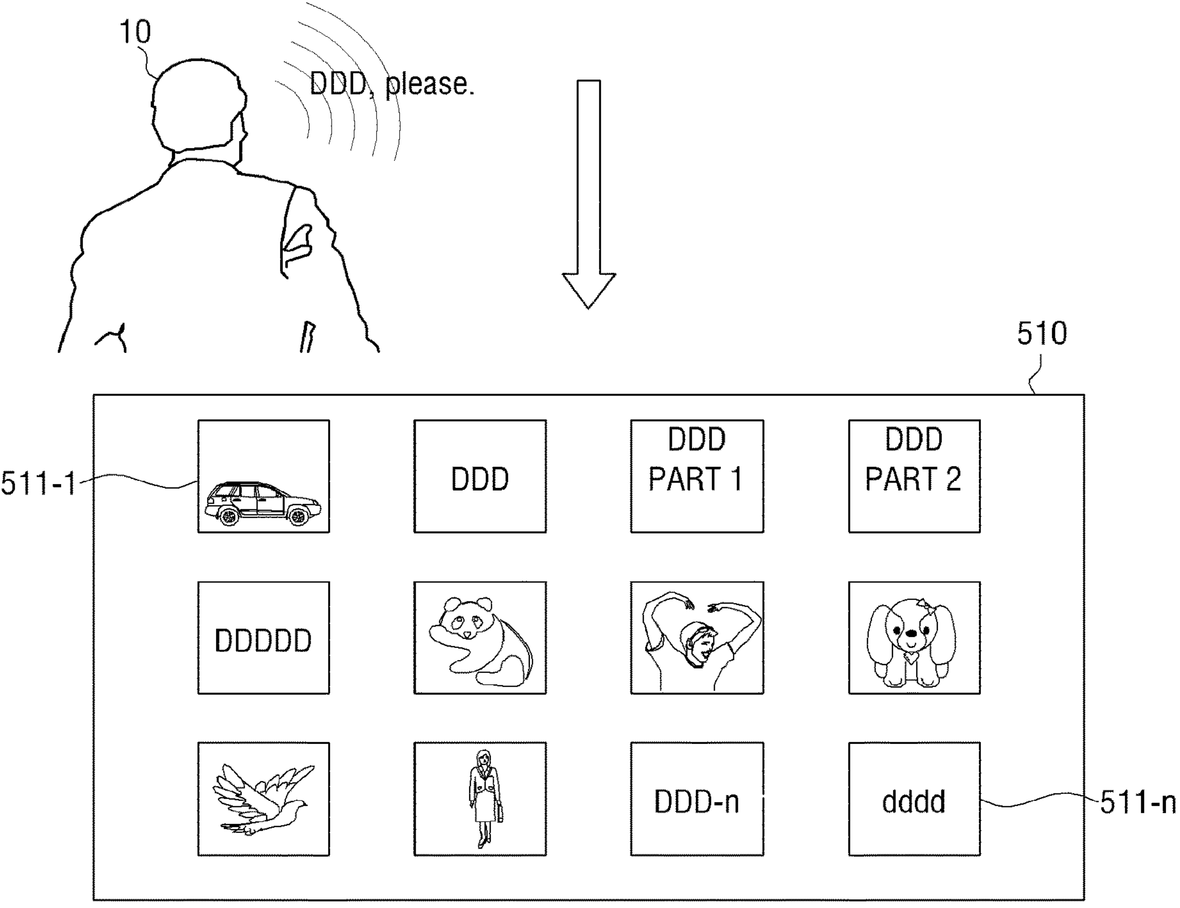

FIG. 6 is a view to illustrate a case in which the user inputs a voice signal while a playback screen 610 of a specific content is being displayed. In this case, the controller 120 determines that a content (for example, DDD) included in the voice signal is not included in the current screen, and displays a search result screen regarding an identification word included in the voice signal. When the voice signal includes the same identification word DDD as in FIG. 5, the same search result screen 510 as in FIG. 5 may be displayed.

In the above-described exemplary embodiments, when an abbreviation for a title or another name is uttered in addition to the full name of the title, the controller 120 may display information on the contents corresponding to the abbreviation or another name.

As described above with reference to FIGS. 4 to 6, even when the user inputs the same voice signal, the display apparatus 100 may provide various resulting screens according to various conditions such as a type of a screen currently displayed, a content display status of the screen, etc.

In the above-described exemplary embodiments, the user inputs the voice signal to designate a specific content. However, the display apparatus 100 may receive a voice signal arbitrarily uttered by the user and may provide various resulting screens according to a meaning of the voice signal.

Figure 7:
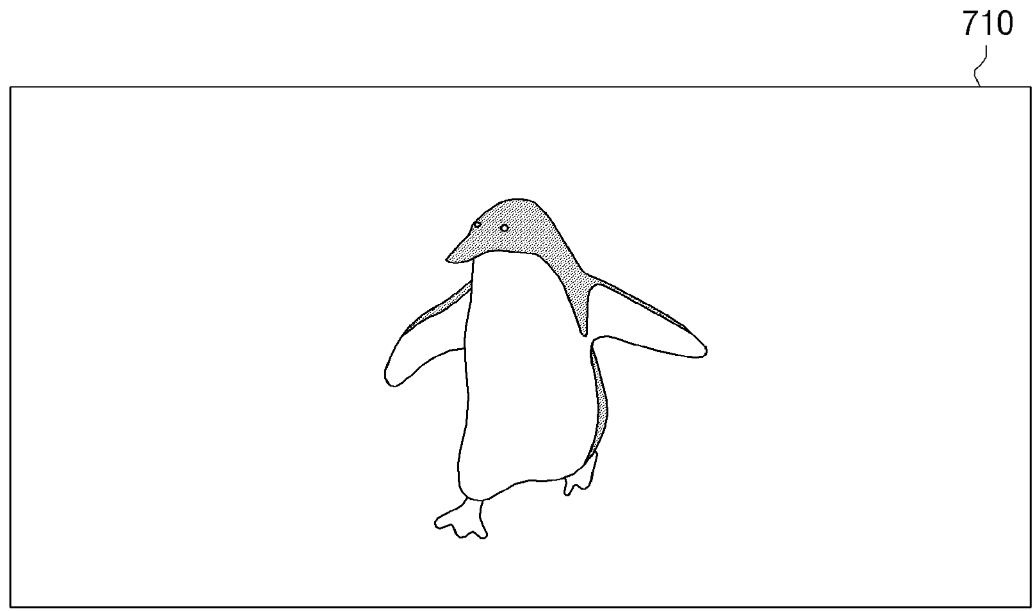
Figure 7:
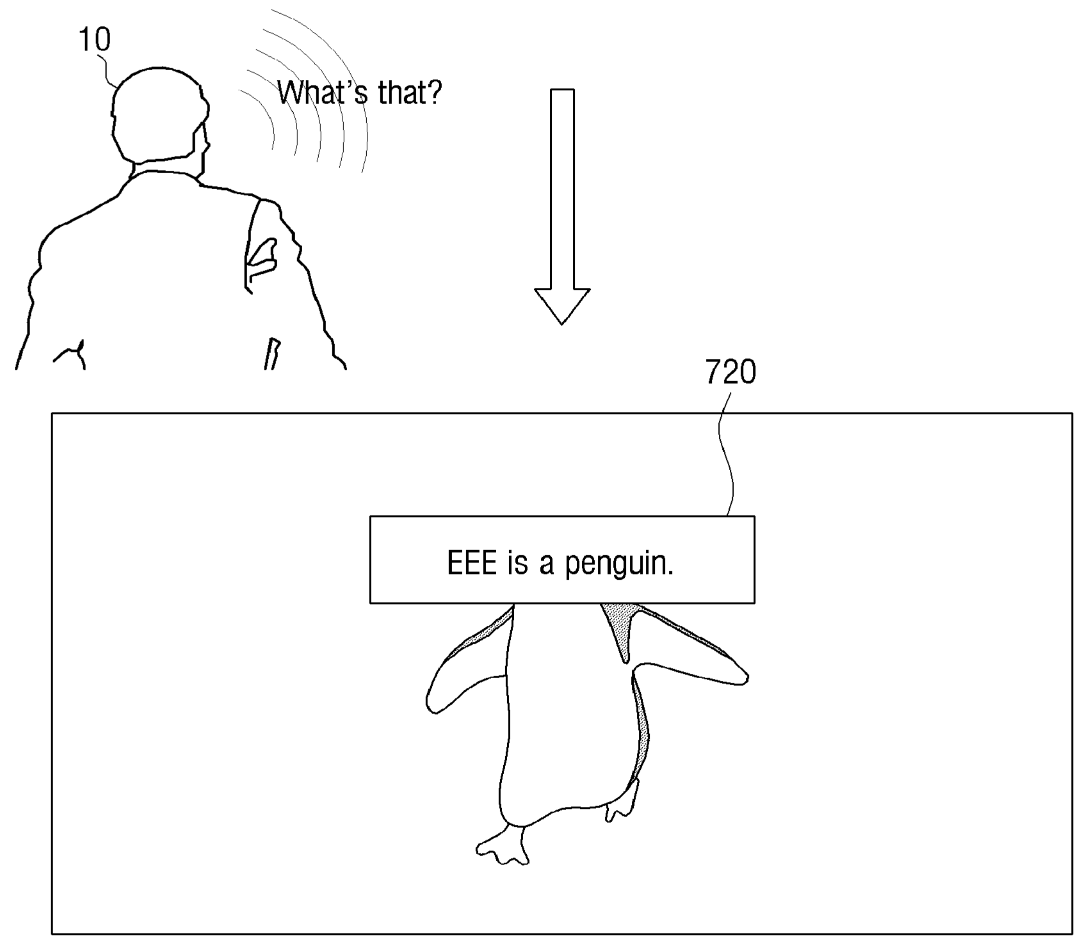

FIG. 7 is a view to illustrate an operation of the display apparatus according to such an exemplary embodiment. FIG. 7 illustrates a case in which the user 10 inputs a voice signal "What's that?" when a certain content screen 710 is being displayed. The controller 120 analyzes the user's voice signal and determines its meaning. Accordingly, the controller 120 determines the object indicated by the expression "that", and displays a response message 720 corresponding to a result of the determining. FIG. 7 illustrates a case in which the user inputs the voice signal when an animation content having a penguin character named EEE is displayed. The controller 120 may configure the response message 720 "EEE is a penguin" in response to the user's question, and may display the response message 720.

The response message may be configured in various ways.

For example, the controller 120 may search a variety of information such as a title, character names, an additional explanation, etc., of the corresponding content from metadata of the currently displayed content. The controller 120 may control the graphic processor 140 to configure the response message 720 according to the result of the search.

According to another exemplary embodiment, the controller 120 may detect an image frame that is displayed at the time the user's voice signal is input. The controller 120 may detect an edge included in the detected image frame and may search related images corresponding to a shape of an object specified by the edge. When the related image is searched, the controller 120 may control the graphic processor 140 to configure the response message 720 to include the related image or to include a text with the related image.

In addition, the controller 120 may access a specific server apparatus based on address information linked with the corresponding content, and may control the graphic processor 140 to configure the response message 720 based on a text provided by the server apparatus.

Figure 8:
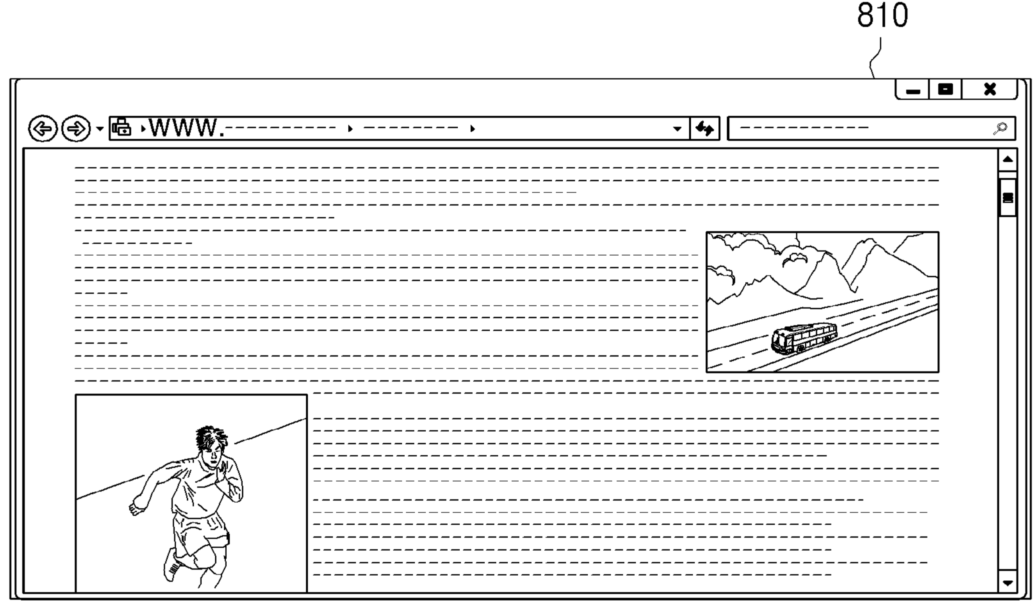
Figure 8:
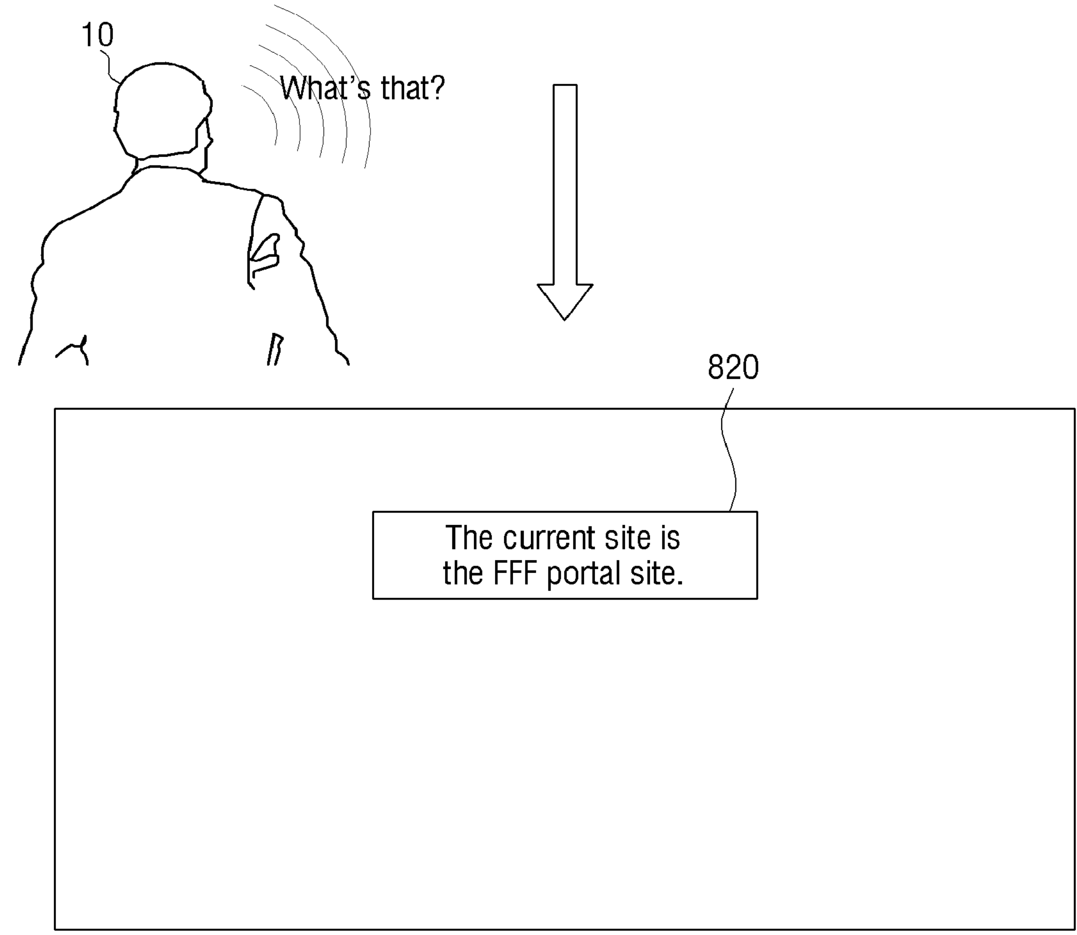

FIG. 8 illustrates a state in which a web screen 810 is displayed. In this state, when the user inputs the voice signal "What's that?", the controller 120 may display a response message 820 based on information from a web server (not shown) which provides the currently displayed web screen 810. In FIG. 8, the response message 820, displaying information indicating that the currently displayed site is the FFF portal site is illustrated.

Figure 9:
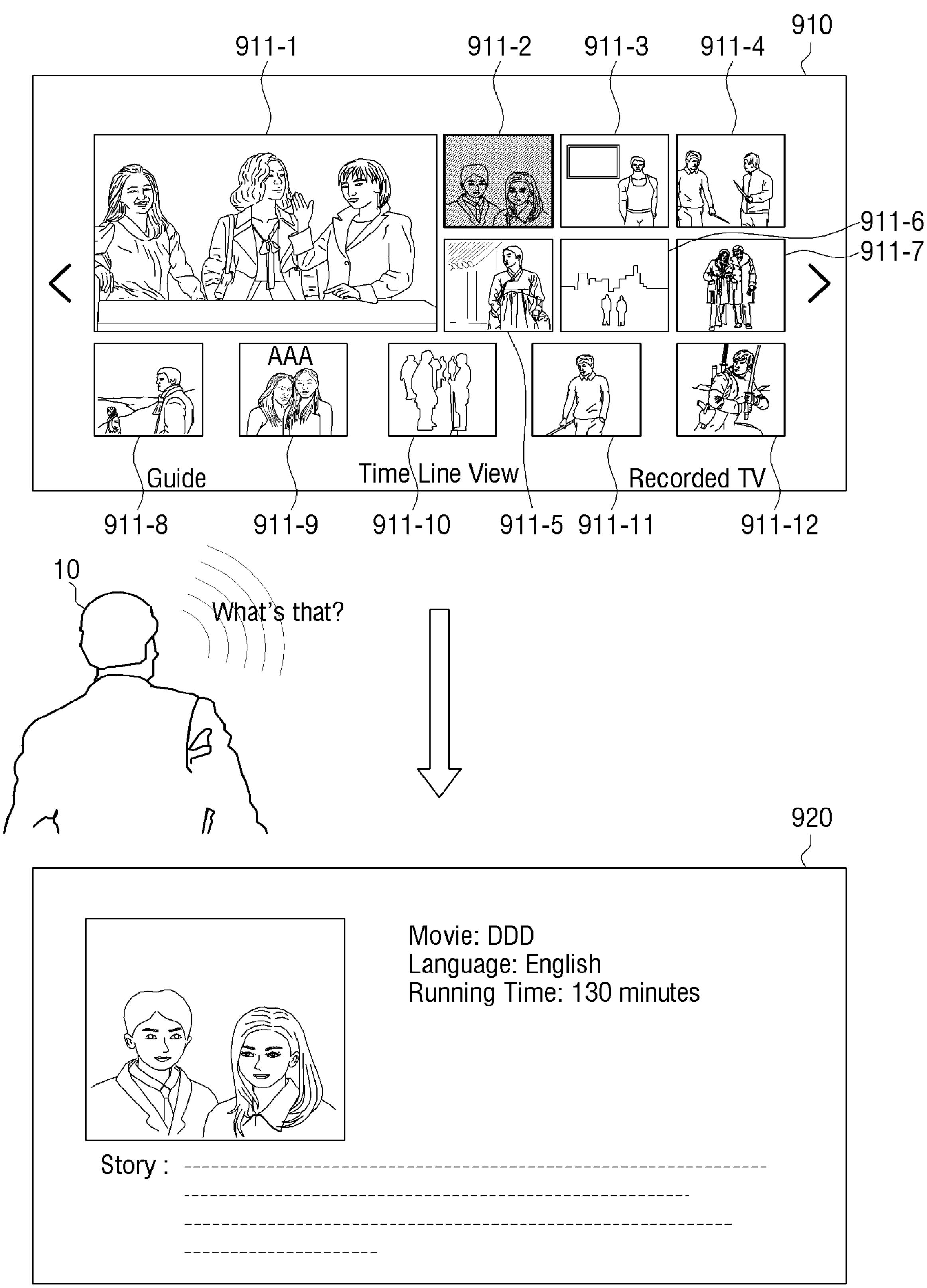

For another example, the controller 120 may control the graphic processor 140 to configure the response message 820 to include a Uniform Resource Locator (URL) of the web screen 810 currently displayed. FIG. 9 is a view to illustrate an exemplary embodiment in which the user inputs a certain voice signal while a content selection screen, which includes information on at least one content, is being displayed. Referring to FIG. 9, a content selection screen 910 may include thumbnail images 911-1 to 911-12 relating to viewable contents.

The controller 120 may highlight one of the thumbnail images 911-1 to 911-12. In FIG. 9, the second thumbnail image 911-2 is highlighted. When the user manipulates a direction key provided on a remote control apparatus or inputs a voice signal indicating a direction, the controller 120 may move the highlighted area of the display in a direction corresponding to the direction key or voice signal. In this state, when the user inputs the voice signal "What's that?", the controller 120 may control the graphic processor 140 and the display 130 to display a detailed information screen 920 linked with the currently highlighted thumbnail image 911-2. For example, when the corresponding thumbnail image 911-2 is a movie content, the detailed information screen 920 may include a variety of information such as a movie title, a language, a running time, a story, a main scene, etc.

In addition, when the user inputs a voice signal "Show me that!", the controller 120 may control the processor to directly replay the content corresponding to the currently highlighted thumbnail image 911-2 and may display a replay screen thereof on the display 130.

According to the various exemplary embodiments described above, the display apparatus can provide various resulting screens according to an operation status of the display apparatus even when the user inputs the same voice signal.

In addition, even when the user inputs the same voice signal, the display apparatus may perform a different control operation according to an operation status of the display apparatus.

Figure 10:
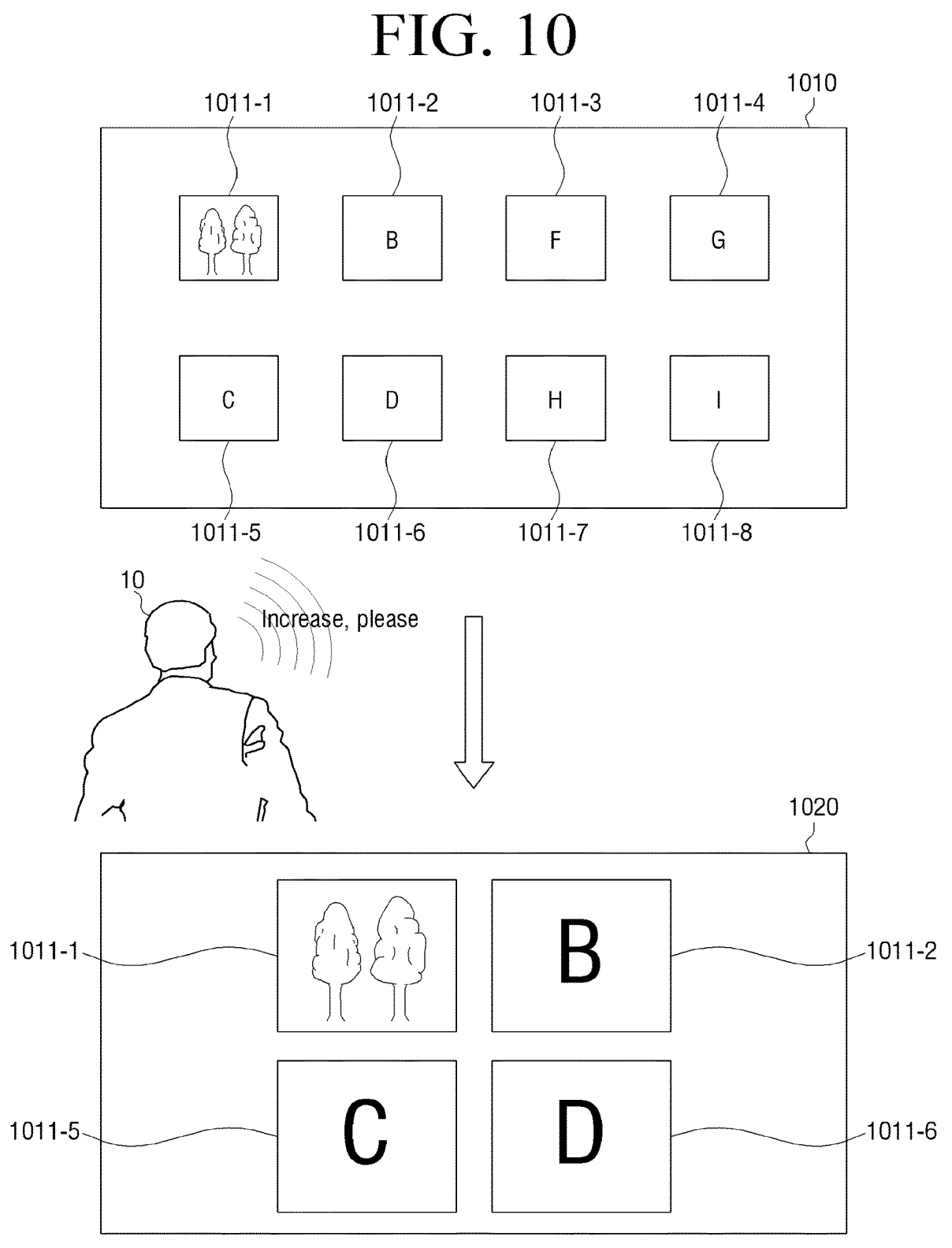
Figure 11:
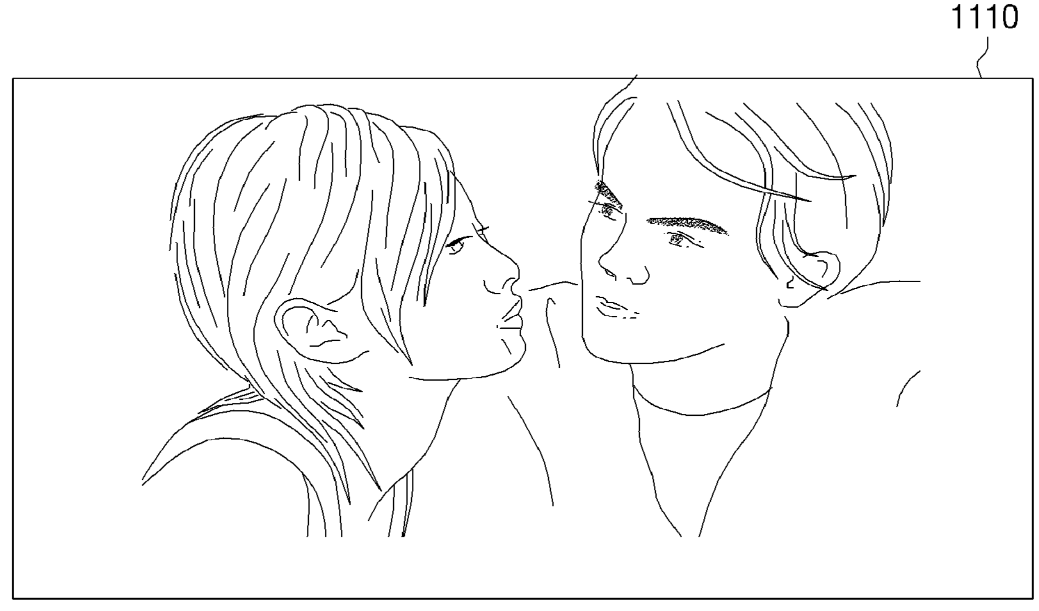
Figure 11:
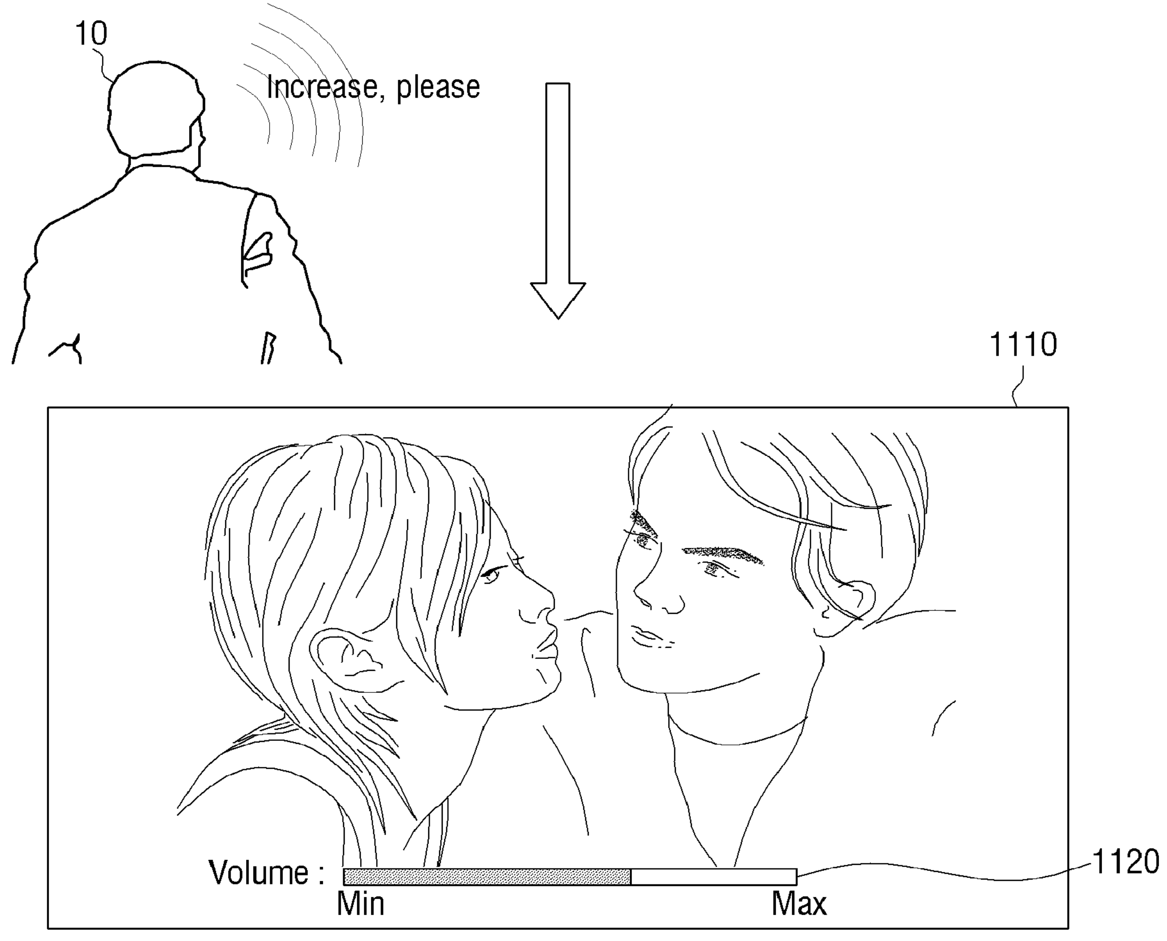

FIGS. 10 and 11 illustrate an operation of a display apparatus according to another exemplary embodiment. According to the present exemplary embodiment, the display apparatus may perform a different control operation according to an operation status of the display apparatus even when the user inputs the same voice signal.

In FIGS. 10 and 11, the user inputs a voice signal "Increase, please." In FIG. 10, a screen 1010 having nothing to do with an audio volume is displayed. Specifically, the display apparatus 100 may display the screen 1010 including a plurality of objects 1011-1 to 1011-8. For example, the content selection screen including the thumbnail images regarding the viewable contents or the screen for the user preference contents may be displayed as shown in FIGS. 2 to 5.

In this state, when the voice signal "Increase, please" is input, the controller 120 may determine that the intention of the user 10 is to magnify the screen 1010. Accordingly, the controller 120 may control the graphic processor 140 to configure a screen 1020, to include the objects 1011-1 to 1011-8 of screen 1010 in a magnified form. When all of the objects 1011-1 to 1011-8 cannot be included in the one screen 1020 as a result of the magnifying, the number of objects included in the one screen 1020 may be reduced. In FIG. 10, eight objects 1011-1 to 1011-8 are included in the pre-magnification screen 1010, whereas only four objects 1011-1, 1011-2, 1011-5, and 1011-6 are included in the post-magnification screen 1020. When the voice signal "Increase, please" is repeatedly input several times, the controller 120 may control the graphic processor 140 to continue magnifying the objects 1011-1 to 1011-8. In addition, when the voice signal is input more than a predetermined number of times, the controller 120 may control the graphic processor 140 to configure one of the objects 1011-1 to 1011-8 (for example, 1011-1) to be a full screen size, so that the one of the objects 1011-1 to 1011-8 is displayed on the entire display. Although each object 1011-1 to 1011-8 is displayed in the form of a thumbnail image in FIG. 10, the objects may be implemented in various forms such as a text, a photo, an image, etc.

FIG. 11 illustrates a state in which a moving image content is replayed and a playback screen 1110 thereof is displayed. In this state, when the user 10 inputs the voice signal "Increase, please", the controller 120 may determine that the user's intention is to turn up the audio volume. Accordingly, the controller 120 may increase the audio volume up to a predetermined level. In addition, the controller 120 may control the graphic processor 140 to configure a Graphic User Interface (GUI) 1120 indicating an audio volume status.

In FIGS. 10 and 11, the voice signal "Increase, please" is input by way of an example. However, when a voice signal "Decrease, please" is input, the controller 120 may perform a different operation such as reducing a size or turning down an audio volume according to a kind of a screen.

According to the various exemplary embodiments as described above, the display apparatus may perform various operations according to an operation status of the display apparatus, even when the user inputs the same voice signal.

In the above-described exemplary embodiment, the display apparatus 100 receives the voice signal and processes the voice signal. However, a broadcast receiving apparatus (for example, a set-top box) without a display may perform the above-described processing operation. When a user's voice signal is input while the display apparatus is displaying a screen including at least one content, the set-top box may configure a different resulting screen, corresponding to the voice signal and according to a content status, and may provide the resulting screen to the display apparatus. Consequently, the resulting screen corresponding to the voice signal is displayed on the display apparatus. The resulting screen configured by the broadcast receiving apparatus may be configured according to various exemplary embodiments as described above with reference to FIGS. 2 to 11. Illustration and explanation of the configuration and operation of the broadcast receiving apparatus will be omitted.

Figure 12:
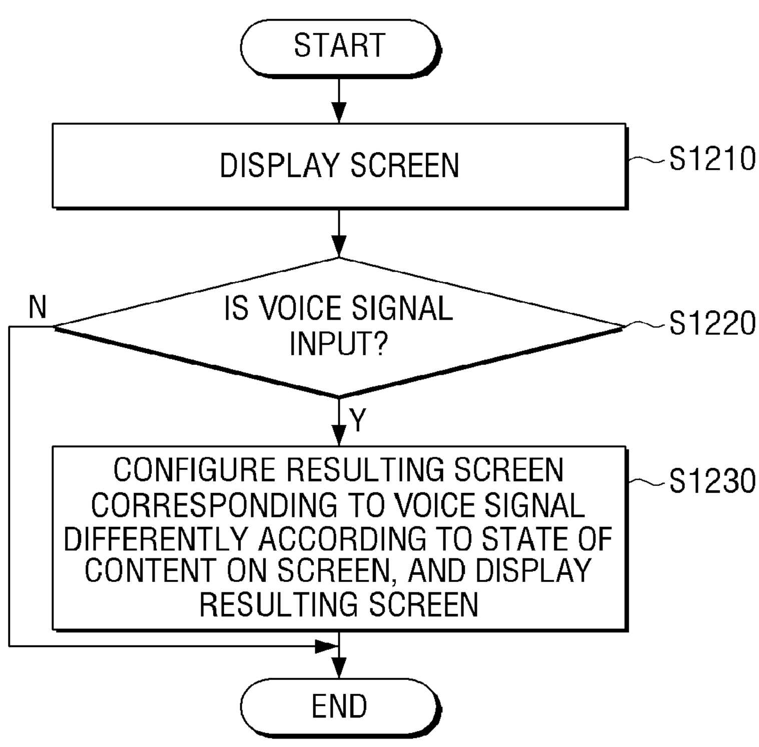
FIG. 12 is a flowchart to illustrate a method for providing content information of a display apparatus according to an exemplary embodiment.

FIG. 12 is a flowchart illustrating a method for providing content information of a display apparatus according to an exemplary embodiment.

Referring to FIG. 12, when the display apparatus 100 displays a certain screen (S1210), the display apparatus 100 may receive a user's voice signal (S1220). The screen may be implemented in various ways as described above with reference to FIGS. 2 to 11. When the user's voice signal is input, the display apparatus 100 may configure a resulting screen corresponding to the voice signal to be displayed differently according to a content status in the screen, and may display the resulting screen (S1230). Such an operation may be independently performed by the display apparatus 100. However, this should not be considered as limiting. According to an exemplary embodiment, the above-described operation may be performed in a display system including a text converter, the display apparatus 100, and a server apparatus.

Figure 13:
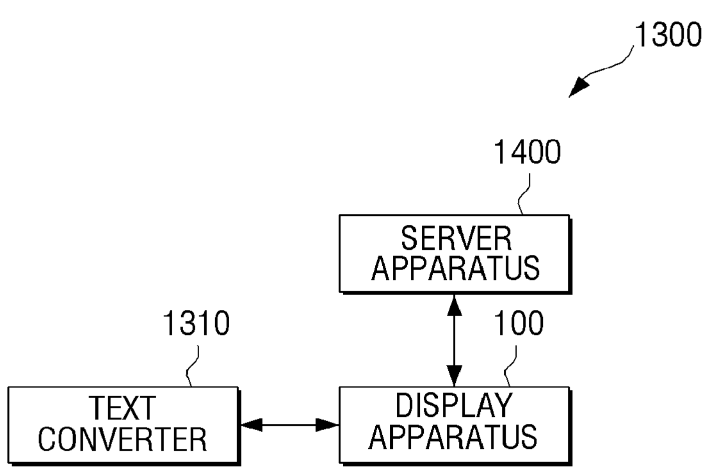
FIG. 13 is a block diagram illustrating a configuration of a display system according to an exemplary embodiment.

FIG. 13 is a block diagram illustrating a configuration of a display system according to an exemplary embodiment. Referring to FIG. 13, the display system 1300 includes a text converter 1310, a display apparatus 100, and a server apparatus 1400.

When a voice signal is input, the display apparatus 100 may transmit the voice signal to the external text converter 1310. The text converter 1310 is an apparatus that converts the voice signal transmitted through the display apparatus 100 into a text, and provides the text to the display apparatus 100. According to an exemplary embodiment, the text converter 1310 may be implemented by using a separate server apparatus or may be included in the server apparatus 1400.

The text converter 1310 may recognize the voice by using at least one of various recognition algorithms, such as a dynamic time warping method, a hidden Markov model, a neural network, etc., and may convert the recognized voice into the text. For example, when the hidden Markov model is used, the text converter 1310 models a temporal change and a spectrum change of the user's voice, respectively, and detects a similar word from a pre-stored language database. Accordingly, the text converter 1310, may output the detected word as a text. The text converter 1310 transmits the text to the display apparatus 100. When the display apparatus 100 is equipped with a text conversion function as described above, the display apparatus 100 does not transmit the voice signal to the text converter 1310, and may instead directly convert the voice signal into the text.

When the text is transmitted from the text converter 1310, the display apparatus 100 may perform a control operation corresponding to the text. For example, when the voice signal input by the user includes a pre-defined voice command, the display apparatus 100 may perform an operation corresponding to the voice command. For example, when the display apparatus 100 is a TV, voice commands may be designated for various operations such as turn on, turn off, volume up, volume down, channel up, channel down, etc., and may be stored. When such a voice command is input, the display apparatus 100 may perform an operation matching the voice command.

On the other hand, when the voice command is not consistent with the text, the display apparatus 100 provides the text to the server apparatus 1400. In addition, the display apparatus 100 may transmit status information regarding a content included in the screen which is displayed at the time the voice signal is input to the server apparatus 1400.

The server apparatus 1400 may receive the status information and the text from the display apparatus 100. The status information and the text may be received simultaneously or may be received in sequence when necessary. For example, the server apparatus 1400 may receive the status information from the display apparatus 100 first and then may receive the text.

The server apparatus 1400 performs searching based on the status information and the text, and transmits a result of the searching to the display apparatus 100. The result of the searching may include a variety of information. For example, the result of the searching may include thumbnail images including various contents, such as a keyword included in the user's voice signal, title information, and address information for acquiring content information.

When the result of the searching is received by the display apparatus 100, the display apparatus 100 may configure a resulting screen based on the result of the searching, and display the resulting screen. The status information may include at least one piece of information from among title information of contents included in the screen, alias title information, and identification information. In addition, the status information may include at least one piece of information from among information on the number of contents included in the screen, information on kinds of contents, and content setting information. The information on the number of contents is information indicating the number of thumbnail images displayed in the screen, and the information on the kinds of contents is information indicating the type of content displayed in the screen from among various contents such as a moving image, a photo, a web page, a TV, a Video On Demand (VOD). The content setting information refers to setting information that is set for each content by the user. For example, the content setting information may be depth information when the content is a 3D content.

For example, the display apparatus 100 may transmit the following status:

TV_status: recommend, smart-function, web-browser, etc.

screen_info: OnTV, Mycontent, Apps, Movies, TV, photo, web page, multimedia, account, recommendation bar, multiscreen, main screen, etc.

panel_depth_info: first, second, third, etc.

panel_text: title1, title2, command1, command2, etc.

contents_title: title-1, title-2, title-3 . . . , title-n alias-title: a-title-1, a-title-2, a-title-3, . . . , title-n content_num: n content_id: ID-1, ID-2, . . . ID-n For another example, when a specific content is replayed, the display apparatus 100 may transmit the following status information:

device_status_type: EPG content_info: content-id-001 content_time: 20130102-10:00 title: EEE is My friend user_id: KIM

The server apparatus 1400 may determine a current status of the display apparatus 100 by using the status information of the display apparatus 100. When a command "AAA, please" is input, the server apparatus 1400 determines whether a content titled AAA exists in the current screen of the display apparatus 100 or not by using the title information, the alias title information, and the identification information of the status information. When the AAA content exists, the server apparatus 1400 may directly transmit the AAA content to the display apparatus 100. According to another exemplary embodiment, the server apparatus 1400 may transmit address information for acquiring the AAA content to the display apparatus 100. When the address information is received, the display apparatus 100 may access a content providing server (not shown) based on the address information and may acquire the AAA content.

The display apparatus 100 included in the display system 1300 of FIG. 13 may include the configuration described above with reference to FIG. 1. However, this should not be considered as limiting.

Figure 14:
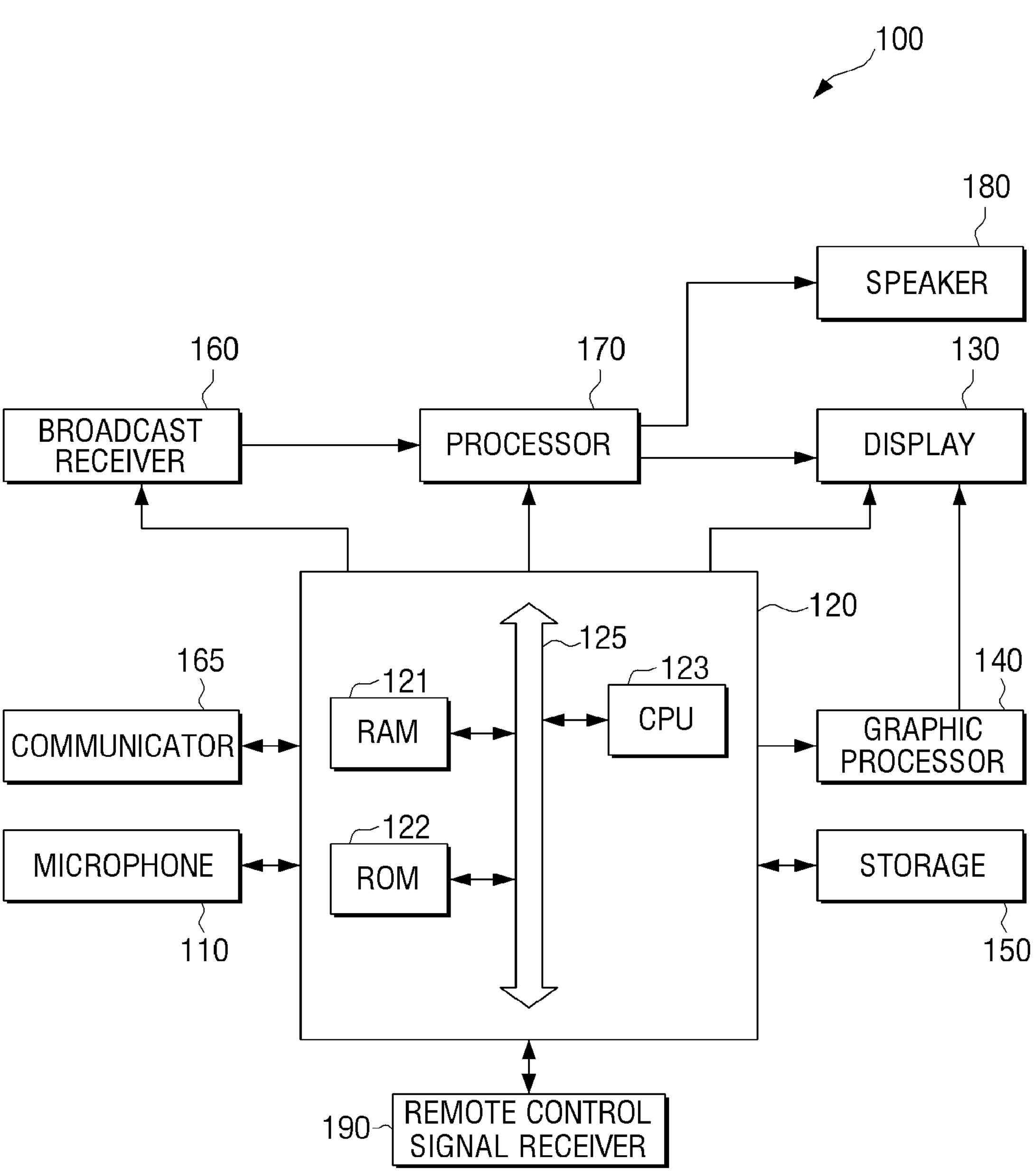
FIG. 14 is a block diagram illustrating an overall configuration of a display apparatus according to various exemplary embodiments.

FIG. 14 is a view illustrating a detailed configuration of the display apparatus 100 according to the above-described exemplary embodiments, when the display apparatus 100 is implemented by using a television.

Referring to FIG. 14, the display apparatus 100 includes a microphone 110, a controller 120, a display 130, a graphic processor 140, a storage 150, a communicator 165, a broadcast receiver 160, a processor 170, a speaker 180, and a remote control signal receiver 190.

The microphone 110 is an element for receiving a voice signal as described above.

The graphic processor 140 is an element for configuring various screens as described above.

The controller 120 may directly convert the voice signal input through the microphone 110 into a text or may transmit the voice signal to the text converter as shown in FIG. 13 to convert the voice signal into the text.

The communicator 165 is an element for communicating with various external apparatuses, including the text converter 1310 and the server apparatus 1400. The communicator 165 may perform communication in various kinds of communication methods. Specifically, the communicator 165 may communicate in various wired and wireless communication methods such as Wi-Fi, Bluetooth, Zigbee, Local Area Network (LAN), 3rd Generation (3G), 4G, Near Field Communication (NFC), etc. The controller 120 may communicate with the text converter 1310 and the server apparatus 1400 through the communicator 165. For example, when a voice signal is input, the controller 120 may transmit status information on the screen, which is displayed at the time when the voice signal is input, and a text corresponding to the voice signal, to the server apparatus 1400 through the communicator 165.

The remote control signal receiver 190 is an element for receiving various remote control signals from a remote control apparatus.

The broadcast receiver 160 is an element for tuning to various broadcasting channels and receiving a broadcast content through the tuned broadcasting channel.

The controller 120 controls the broadcast receiver 160 to tune to the broadcasting channel according to a remote control signal received from the remote control signal receiver 190.

The processor 170 is an element for processing contents. The processor 170 may process various contents such as a broadcast content received through the broadcast receiver 160, a content received through other networks such as the Internet, and contents stored in the storage 140, and may replay the contents.

The processor 170 may include a video processor and an audio processor. The video processor is an element for processing video data included in the content. The video processor may perform various image processing operations such as decoding, scaling, noise filtering, frame rate conversion, resolution conversion, etc. with respect to the video data. The audio processor is an element for processing audio data included in the content. The audio processor may perform various processing operations such as decoding, amplification, noise filtering, etc. with respect to the audio data.

The display 130 may output the video data processed by the processor 170.

The speaker 180 may output the audio data processed by the processor 170.

The storage 150 is an element for storing various programs or data and contents necessary for the operation of the display apparatus 100.

The controller 120 controls the overall operation of the display apparatus 100 using programs stored in the storage 150. The controller 120 may be configured in various forms. For example, the controller 120 may include a Random Access Memory (RAM) 121, a Read Only Memory (ROM) 122, a CPU 123, and a bus 125 as shown in FIG. 14. The RAM 121, the ROM 122, and the CPU 123 may be connected to one another through the bus 125.

The CPU 123 accesses the storage 150 and performs booting by using an Operating System (OS) stored in the storage 150. In addition, the CPU 123 performs various operations using various programs, contents, data, etc., stored in the storage 150.

The ROM 122 stores a set of commands to boot the system. When a turn on command is input and power is supplied, the CPU 123 copies the OS stored in the storage 150 into the RAM 121 according to a command stored in the ROM 122, executes the O/S and boots the system. When the booting is completed, the CPU 123 copies the various programs stored in the storage 150 into the RAM 121, executes the programs copied into the RAM 121, and performs various operations.

In addition, although not shown in FIG. 14, the display apparatus 100 may further include various elements such as a microphone, a camera, a USB port, an external input port, etc.

Figure 15:
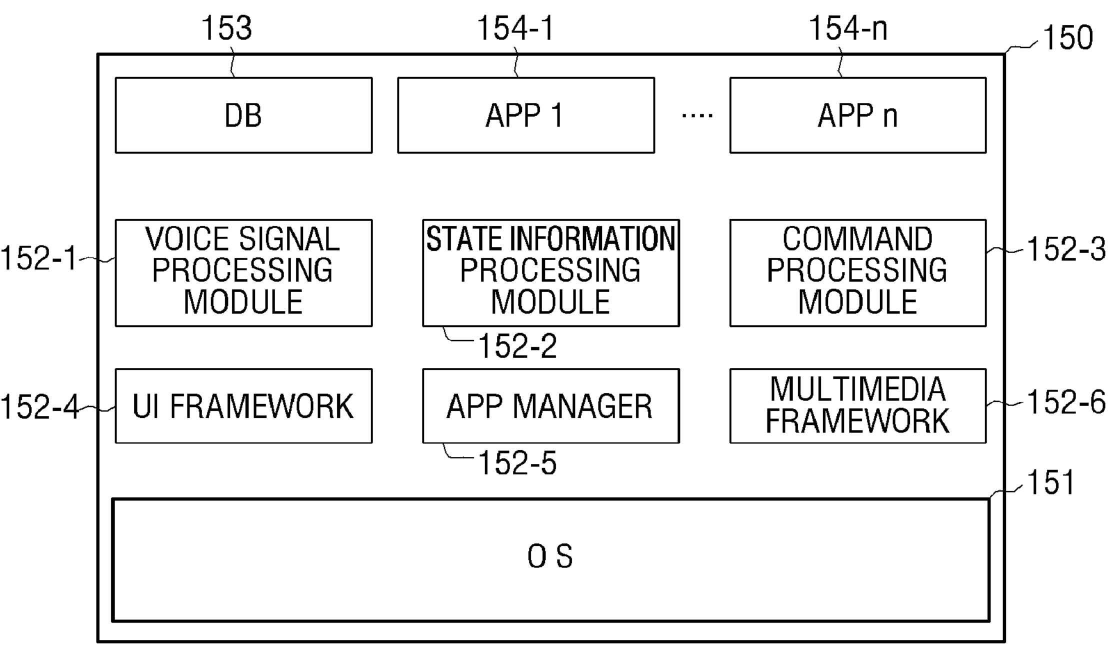
FIG. 15 is a view to illustrate a software structure of a display apparatus according to an exemplary embodiment.

FIG. 15 illustrates a structure of software stored in the display apparatus 100 according to an exemplary embodiment. Referring to FIG. 15, the storage 150 may store an OS 151, a voice signal processing module 152-1, a status information processing module 152-2, a command processing module 152-3, a UI framework 152-4, an APP manager 152-5, a multimedia framework 152-6, a database 153, and various applications 154-1 to **154-*n***.

The OS 151 controls and manages an overall operation of hardware. That is, the OS 151 is software that performs a basic function such as hardware management, memory, and security.

The voice signal processing module 152-1 is software for converting a voice signal input through the microphone 110 into a text. The text conversion may be performed according to various algorithms as described above.

The status information processing module 152-2 is an element for generating status information on various contents included in the screen displayed on the display 130. The status information may be configured in various forms as described above.

The command processing module 152-3 is an element for parsing a command transmitted from the server apparatus 1400. The controller 120 performs an operation corresponding to the command processed by the command processing module 152-3.

The UI framework 152-4 is a module for providing various UIs to be displayed on the display 130. The UI framework 152-4 may include an image compositor module to configure various kinds of objects to be included in the screen, a coordinate compositor to calculate coordinates of an object to be displayed, a rendering module to render the configured object on the calculated coordinates, and a 2D/3D UI toolkit to provide a tool for configuring a UI of a 2D or 3D format. The controller 120 may display various screens as described above with reference to FIGS. 2 to 11 by executing the UI framework 152-3.

The APP manager 152-5 is a module for managing execution statuses of various applications installed in the storage 150. When an application execution event is detected, the APP manager 152-5 calls an application corresponding to the event and executes the application.

The database 153 includes various voice commands or keywords. In addition, various applications 155-1 to 155-*n* may be stored in the storage 150.

The software structure shown in FIG. 15 is merely an example and is not limited to this. Accordingly, some of the elements may be omitted or changed or a new element may be added when necessary. For example, when the display apparatus 100 is not equipped with a text conversion function, the voice signal processing module 152-1 and the database 153 may be omitted.

As described above, the display apparatus 100 may be implemented by using various types of apparatuses in addition to the television. Accordingly, the configuration described in FIGS. 14 and 15 may be changed in various ways according to a type of display apparatus 100.

Figure 16:
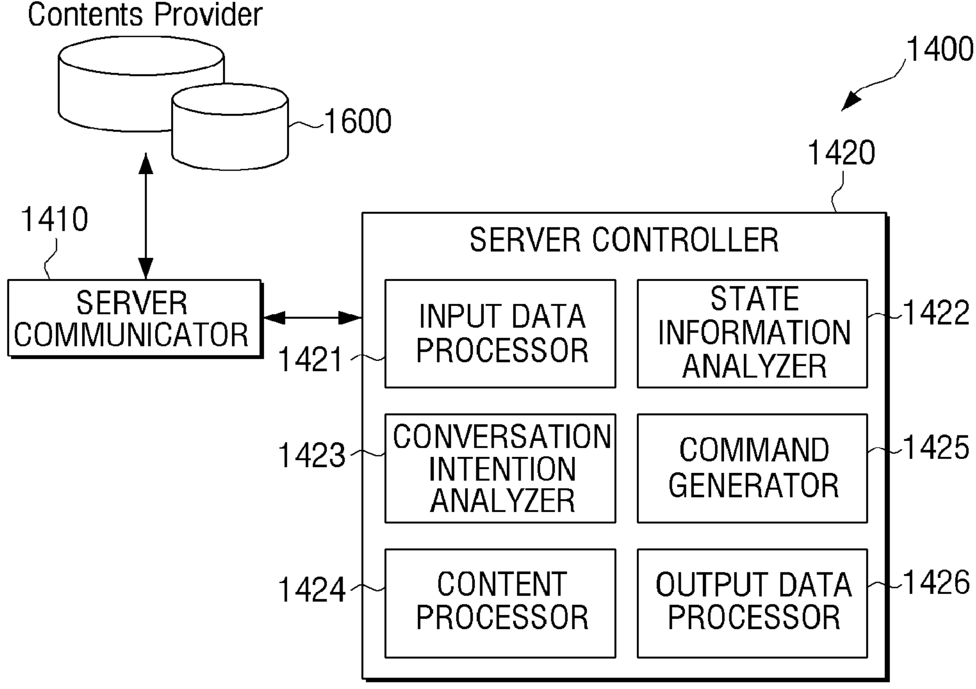
FIG. 16 is a view illustrating a configuration of a server apparatus according to an exemplary embodiment.

FIG. 16 is a block diagram illustrating an example of a configuration of the server apparatus included in the display system 1300. Referring to FIG. 16, the server apparatus 1400 includes a server communicator 1410 and a server controller 1420.

The server communicator 1410 is an element for communicating with the display apparatus 100. The server communicator 1410 may receive status information on at least one content in the screen which is being displayed on the display apparatus 100, and a text.

The server controller 1420 may perform a search according to an intended use of the display apparatus 100 based on the status information and the text. Specifically, the server controller 1420 may identify contents included in the screen of the display apparatus 100 based on the status information. When a content designated by the text exists in the identified contents, the server controller 1420 may search for address information for acquiring the designated content and may transmit the address information to the display apparatus. On the other hand, when the content designated by the text does not exist in the screen of the display apparatus 100, the server controller 1420 may perform a search using the text and transmit a result of the search to the display apparatus 100.

The server controller 1420 includes an input data processor 1421, a conversation intention analyzer 1422, a content processor 1423, a status information analyzer 1424, a command generator 1425, and an output data processor 1426.

The input data processor 1421 is an element for parsing data transmitted from the display apparatus 100, and providing the data to each of the elements 1422 to 1426.

The status information analyzer 1422 is an element for receiving status information processed by the input data processor 1421 and analyzing the status information. The status information analyzer 1422 may determine what content is included in the screen displayed on the display apparatus 100 and what kind of screen is displayed by analyzing the status information.

The conversation intention analyzer 1423 is an element for analyzing a user's intent based on the text received through the server communicator 1410 and a result of the analyzing by the status information analyzer 1422.

The content processor 1424 is an element for generating a query including information on a content designated by the user's voice signal. The server communicator 1410 may transmit the query to a content providing server 1600 or other databases, and may receive a response signal to the query. The response signal may include a result of a search.

The command generator 1425 generates a command corresponding to the display apparatus 100 based on the result of the analyzing by the conversation intention analyzer 1423 and the response signal.

The output data processor 1426 is an element for generating output data including the generated command and the result of the searching. The output data may be generated in a format so that the output data can be processed in the display apparatus.

Figure 17:
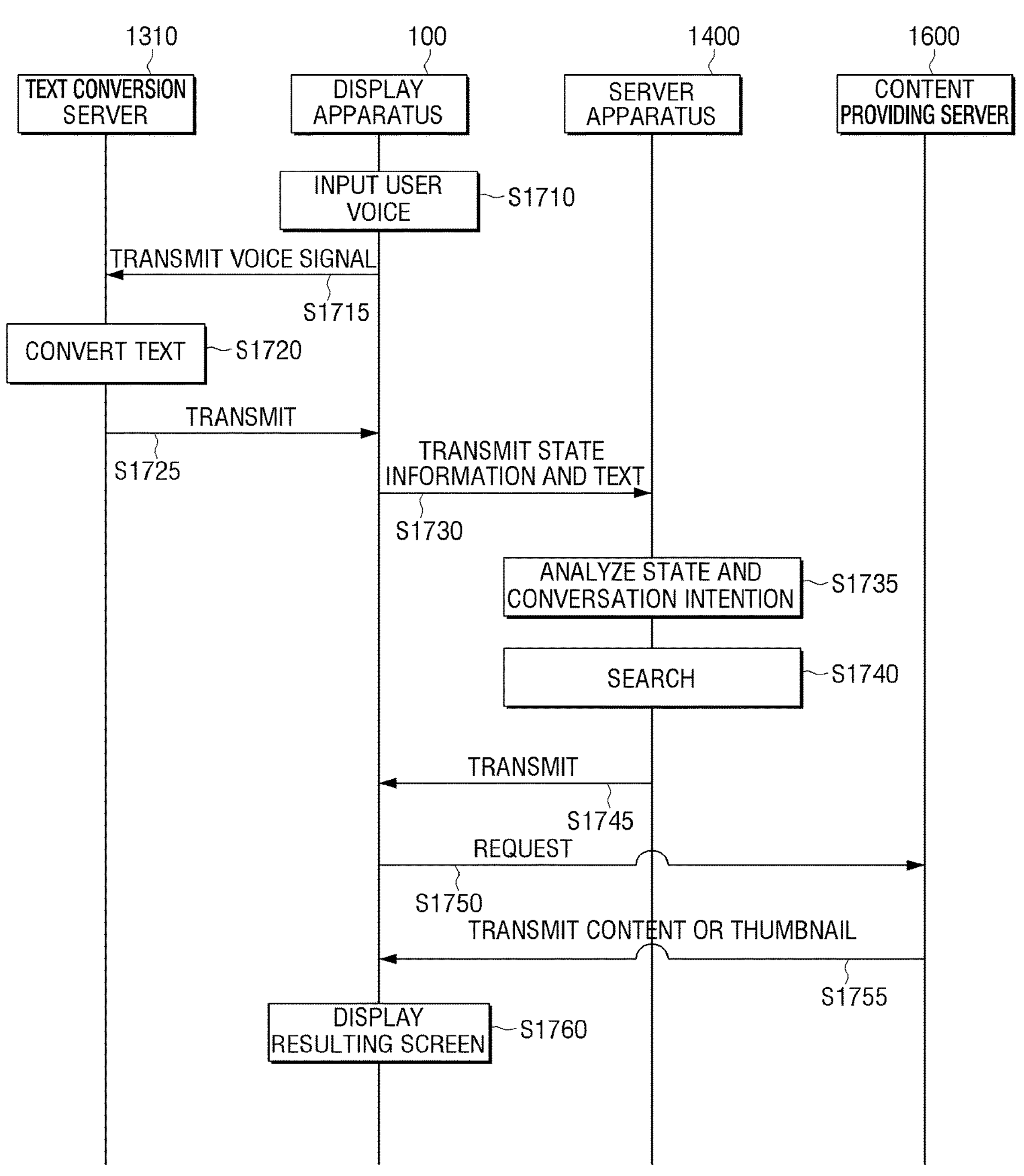
FIG. 17 is a timing chart to illustrate an operation of a display system according to an exemplary embodiment.

FIG. 17 is a timing chart to illustrate the operation of the display system according to an exemplary embodiment. Referring to FIG. 17, when a user's voice is input (S1710), the display apparatus 100 transmits the voice signal to the text converter 1310.

The text converter 1310 converts the voice signal into a text (S1720), and transmits the text to the display apparatus 100 (S1725). The display apparatus 100 transmits the text and status information to the server apparatus 1400 (S1730). The status information may be configured in various ways as described above.

The server apparatus 1400 analyzes a conversation intention based on the status information (S1735). The server apparatus 1400 performs searching corresponding to the analyzed conversation intention (S1740). The searching may be performed in various ways as described above with reference to FIGS. 2 to 11.

The server apparatus 1400 transmits a result of the searching to the display apparatus 100 (S1745). The result of the searching may include address information for acquiring various contents. The display apparatus 100 accesses the content providing server 1600 according to the address information included in the result of the searching. The display apparatus 100 requests content information from the content providing server 1600.

The content providing server 1600 may provide the content or thumbnail images according to the request (S1755).

The display apparatus 100 may configure a resulting screen based on the transmitted data (S1760). The resulting screen may be configured in various ways according to the status of the display apparatus 100 and the user's voice signal as shown in FIGS. 2 to 11, and the resulting screen may be displayed.

As described above, the display apparatus 100 may display various resulting screens according to the voice signal input by the user and the screen display status of the display apparatus 100.

The display apparatus or the method for providing content information of the display system according to the above-described exemplary embodiments may be stored in a non-transitory readable medium. The non-transitory readable medium may be mounted and used in various devices.

The non-transitory readable medium refers to a medium that stores data semi-permanently rather than storing data for a very short time, such as a register, a cache, and a memory, and is readable by an apparatus. Specifically, the non-transitory readable medium may be a compact disc (CD), a digital versatile disk (DVD), a hard disk, a Blu-ray disk, a USB, a memory card, a ROM, etc.

For example, a program code for displaying a screen including at least one content, receiving a voice signal, and configuring a resulting screen corresponding to the voice signal differently according to a status of the content, and displaying the resulting screen, may be stored in a non-transitory readable medium and provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:

a display;

a voice receiver; and a communicator;

a processor configured to:

while a list user interface (UI) including a plurality of contents corresponding to a first search result received from a server is displayed on the display, receive a user voice input via the voice receiver, based on a specific content among the plurality of contents included in the list UI displayed on the display according to status information being selected by the user voice input, control the display to display the selected specific content, and based on one of the plurality of contents included in the list UI displayed on the display according to the status information not being selected by the user voice input, receive a second search result corresponding to the user voice input from the server via the communicator and control the display to display the second search result.

2. The display apparatus of claim 1, wherein the status information comprises at least one of title of content included in a screen output on the display, identification information for identifying content included in the screen or information on a number of contents included in the screen.

3. The display apparatus of claim 1, wherein the status information comprises a first identification word corresponding to the specific content included in the list UI displayed on the display, and wherein the processor is configured to, based on the user voice input corresponding to the first identification word, control the display to display the specific content.

4. The display apparatus of claim 3, wherein the processor is configured to, based on the user voice input corresponding to a second identification word not corresponding to the specific content included in the list UI, receive a third search result corresponding to the second identification word from the server via the communicator and control the display to display the third search result.

5. The display apparatus of claim 1, wherein the processor is configured to, based on the specific content included in the list UI being selected by the user voice input received from an external apparatus via the communicator, control the display to display the selected specific content.

6. The display apparatus of claim 1, wherein the list UI comprises a plurality of thumbnails, and wherein the plurality of thumbnails comprise a thumbnail corresponding to broadcast content and a thumbnail corresponding to content received via the communicator.

7. The display apparatus of claim 6, wherein the plurality of thumbnails comprise information on whether content corresponding to a thumbnail of the plurality of thumbnails is currently viewable.

8. The display apparatus of claim 1, wherein the processor is configured to:

based on the selected specific content being broadcast content, tune a broadcasting channel for providing the specific content, and control the display to display the broadcast content received from the broadcasting channel.

9. The display apparatus of claim 1, wherein the processor is configured to:

based on the specific content included in the list UI being selected by the user voice input, receive address information corresponding to the selected specific content from the server via the communicator, and control the display to display the selected specific content based on data received via the communicator according to the address information.

10. The display apparatus of claim 1, wherein the processor is configured to, based on the specific content included in the list UI not being selected by the user voice input, receive a fourth search result corresponding to an identification word among keywords included in the user voice input and control the display to display the fourth search result.

11. A method for controlling a display apparatus including a display, the method comprising:

while a list user interface (UI) including a plurality of contents corresponding to a first search result received from a server is displayed on the display, receiving a user voice input, based on a specific content among the plurality of contents included in the list UI displayed on the display according to status information being selected by the user voice input, displaying the selected specific content, and based on one of the plurality of contents included in the list UI displayed on the display according to the status information not being selected by the user voice input, receiving a second search result corresponding to the user voice input from the server and displaying the second search result.

12. The method of claim 11, wherein the status information comprises at least one of title of content included in a screen output on the display, identification information for identifying content included in the screen or information on a number of contents included in the screen.

13. The method of claim 11, wherein the status information comprises a first identification word corresponding to the specific content included in the list UI displayed on the display, and wherein the displaying the selected specific content comprises, based on the user voice input corresponding to the first identification word, displaying the specific content.

14. The method of claim 13, wherein the displaying the second search result comprises, based on the user voice input corresponding to a second identification word not corresponding to the specific content included in the list UI, receiving a third search result corresponding to the second identification word from the server and displaying the third search result.

15. The method of claim 11, further comprising, based on the specific content included in the list UI being selected by the user voice input received from an external apparatus, displaying the selected specific content.

16. The method of claim 11, wherein the list UI comprises a plurality of thumbnails, and wherein the plurality of thumbnails comprise a thumbnail corresponding to broadcast content and a thumbnail corresponding to content received.

17. The method of claim 16, wherein the plurality of thumbnails comprise information on whether content corresponding to a thumbnail of the plurality of thumbnails is currently viewable.

18. The method of claim 11, wherein the displaying the selected specific content comprises:

based on the selected specific content being broadcast content, tuning a broadcasting channel for providing the specific content, and displaying the broadcast content received from the broadcasting channel.

19. The method of claim 11, wherein the displaying the selected specific content comprises:

based on the specific content included in the list UI being selected by the user voice input, receiving address information corresponding to the selected specific content from the server, and displaying the selected specific content based on data received according to the address information.

20. The method of claim 11, wherein the displaying the second search result comprises, based on the specific content included in the list UI not being selected by the user voice input, receiving a fourth search result corresponding to an identification word among keywords included in the user voice input and displaying the fourth search result.

* * * * *